United States Patent
Li et al.

(10) Patent No.: US 10,466,388 B2
(45) Date of Patent: Nov. 5, 2019

(54) SYSTEM AND METHOD FOR EDITING GEOLOGICAL MODELS BY SWITCHING BETWEEN VOLUME-BASED MODELS AND SURFACE-BASED STRUCTURAL MODELS AUGMENTED WITH STRATIGRAPHIC FIBER BUNDLES

(71) Applicant: EMERSON PARADIGM HOLDING LLC, Houston, TX (US)

(72) Inventors: Wan-Chiu Li, Nancy (FR); Anne-Laure Tertois, Saint Cyr la Riviere (FR); Romain Merland, Carnac (FR)

(73) Assignee: Emerson Paradigm Holding LLC, Houston, TX (US)

( * ) Notice: Subject to any disclaimer, the term of this patent is extended or adjusted under 35 U.S.C. 154(b) by 0 days.

(21) Appl. No.: 15/258,776

(22) Filed: Sep. 7, 2016

(65) Prior Publication Data
US 2018/0067229 A1 Mar. 8, 2018

(51) Int. Cl.
*G01V 99/00* (2009.01)
*G01V 1/28* (2006.01)
(Continued)

(52) U.S. Cl.
CPC ............ *G01V 99/005* (2013.01); *G01V 1/282* (2013.01); *G01V 11/00* (2013.01); *G01V 1/302* (2013.01);
(Continued)

(58) Field of Classification Search
None
See application file for complete search history.

(56) References Cited

U.S. PATENT DOCUMENTS

| | | |
|---|---|---|
| 4,504,438 A | 3/1985 | Levy et al. |
| 4,821,164 A | 4/1989 | Swanson |

(Continued)

FOREIGN PATENT DOCUMENTS

| | | |
|---|---|---|
| AU | 2002329615 | 7/2002 |
| CA | 2 455 810 | 7/2005 |

(Continued)

OTHER PUBLICATIONS

Ernens, "Finite Element Methods with exact geometry representation", Master of Science Thesis, Delft University of Technology, Nov. 2011, 128 pages.*

(Continued)

*Primary Examiner* — Kibrom K Gebresilassie
(74) *Attorney, Agent, or Firm* — Pearl Cohen Zedek Latzer Baratz LLP

(57) ABSTRACT

A method for editing a volume-based model imaging geological structures. An initial volume-based model comprising a volumetric mesh and updated geological data defined within a region of the model is received. The volume-based model is decomposed by converting the volumetric mesh into surface meshes linked by stratigraphic fibers to generate a surface-based model. The defined region of the surface-based model is edited by editing positions of control nodes of the surface meshes along the stratigraphic fibers in the defined region of the model so as to fit the updated geological data. The plurality of stratigraphic fibers are updated based on the edited positions of the control nodes so as to fit the updated geological data. The edited surface-based model is meshed to generate an updated volume-based model comprising a volumetric mesh defined by the edited positions of the control nodes. The updated volume-based model is stored and/or displayed.

31 Claims, 11 Drawing Sheets

(51) Int. Cl.
*G01V 11/00* (2006.01)
*G01V 1/30* (2006.01)
*G06T 17/20* (2006.01)
*G06T 19/20* (2011.01)
*G06T 17/05* (2011.01)

(52) U.S. Cl.
CPC .......... *G01V 2210/66* (2013.01); *G06T 17/05* (2013.01); *G06T 17/20* (2013.01); *G06T 19/20* (2013.01); *G06T 2219/2021* (2013.01)

(56) References Cited

U.S. PATENT DOCUMENTS

| | | |
|---|---|---|
| 4,953,140 A | 8/1990 | Dablain |
| 4,964,099 A | 10/1990 | Carron |
| 4,991,095 A | 2/1991 | Swanson |
| 5,056,066 A | 10/1991 | Howard |
| 5,251,184 A | 10/1993 | Hildebrand et al. |
| 5,384,752 A | 1/1995 | Duren et al. |
| 5,465,323 A | 11/1995 | Mallet |
| 5,475,589 A | 12/1995 | Armitage |
| 5,570,106 A | 10/1996 | Viswanathan |
| 5,586,082 A | 12/1996 | Anderson et al. |
| 5,594,807 A | 1/1997 | Liu |
| 5,671,136 A | 9/1997 | Willhoit |
| 5,675,551 A | 10/1997 | Sitoh |
| 5,844,799 A | 12/1998 | Joseph et al. |
| 5,987,388 A | 11/1999 | Crawford et al. |
| 5,995,907 A | 11/1999 | Van Bemmel et al. |
| 6,018,498 A | 1/2000 | Neff et al. |
| 6,106,561 A | 8/2000 | Farmer |
| 6,138,076 A | 10/2000 | Graf et al. |
| 6,151,555 A | 11/2000 | Van Bemmel et al. |
| 6,236,942 B1 | 5/2001 | Bush |
| 6,246,963 B1 | 6/2001 | Cross et al. |
| 6,256,599 B1 | 7/2001 | Tiribuzi |
| 6,278,949 B1 | 8/2001 | Alam |
| 6,353,577 B1 | 3/2002 | Orban et al. |
| 6,411,903 B2 | 6/2002 | Bush |
| 6,597,995 B1 | 7/2003 | Cornu et al. |
| RE38,229 E | 8/2003 | Marfurt et al. |
| 6,725,174 B2 | 4/2004 | Bouts et al. |
| 6,771,800 B2 | 8/2004 | Keskes et al. |
| 6,778,909 B1 | 8/2004 | Popovici et al. |
| 6,791,900 B2 | 9/2004 | Gillard et al. |
| 6,820,043 B2 | 11/2004 | Mallet et al. |
| 6,847,737 B1 | 1/2005 | Kouri et al. |
| 6,850,845 B2 | 2/2005 | Stark |
| 6,889,142 B2 | 5/2005 | Schonewille |
| 6,904,169 B2 | 6/2005 | Kalevo et al. |
| 7,024,021 B2 | 4/2006 | Dunn et al. |
| 7,089,166 B2 | 8/2006 | Malthe-Sorenssen et al. |
| 7,126,340 B1 | 10/2006 | Ameen et al. |
| 7,187,794 B2 | 3/2007 | Liang et al. |
| 7,227,983 B1 | 6/2007 | Christian et al. |
| 7,248,539 B2 | 7/2007 | Borgos et al. |
| 7,280,918 B2 | 10/2007 | Williams |
| 7,412,363 B2 | 8/2008 | Callegari |
| 7,418,149 B2 | 8/2008 | Dinh et al. |
| 7,446,765 B2 | 11/2008 | Dugge |
| 7,480,205 B2 | 1/2009 | Wei et al. |
| 7,523,024 B2 | 4/2009 | Endres et al. |
| 7,561,992 B2 | 7/2009 | Leflon et al. |
| 7,616,213 B2 | 11/2009 | Chuter |
| 7,660,481 B2 | 2/2010 | Schaap et al. |
| 7,711,532 B2 | 5/2010 | Dulac et al. |
| 7,742,875 B2 | 6/2010 | Li et al. |
| 7,744,534 B2 | 6/2010 | Chalana et al. |
| 7,844,402 B2 | 11/2010 | Klein et al. |
| 7,869,954 B2 | 1/2011 | Lennert et al. |
| 7,970,593 B2 | 6/2011 | Roggero et al. |
| 7,991,717 B1 | 8/2011 | Bush |
| 8,010,294 B2 | 8/2011 | Dorn et al. |
| 8,022,947 B2 | 9/2011 | Wei et al. |
| 8,065,088 B2 | 11/2011 | Dorn et al. |
| 8,117,019 B2 | 2/2012 | Sun et al. |
| 8,120,991 B2 | 2/2012 | Koren |
| 8,150,663 B2 | 4/2012 | Mallet |
| 8,219,370 B1 | 7/2012 | Diverdi et al. |
| 8,274,859 B2 | 9/2012 | Maucec et al. |
| 8,600,708 B1 | 12/2013 | Mallet et al. |
| 8,619,499 B2 | 12/2013 | Maucec et al. |
| 8,635,052 B1 | 1/2014 | Mallet et al. |
| 8,711,140 B1 | 4/2014 | Mallet |
| 8,731,875 B2 | 5/2014 | Hilliard et al. |
| 8,743,115 B1 | 6/2014 | Mallet et al. |
| 9,052,413 B1 | 6/2015 | Mallet et al. |
| 9,053,570 B1 | 6/2015 | Mallet et al. |
| 9,142,059 B1 | 9/2015 | Mallet et al. |
| 9,176,245 B2 | 11/2015 | Craig |
| 9,229,130 B1 | 1/2016 | Mallet |
| 9,355,494 B1 | 5/2016 | Mallet et al. |
| 9,395,466 B1 | 7/2016 | Mallet et al. |
| 9,418,182 B2 | 8/2016 | Mallet |
| 9,477,010 B2 | 10/2016 | Mallet |
| 9,524,590 B1 | 12/2016 | Mallet |
| 9,536,022 B1 | 1/2017 | Tertois et al. |
| 2001/0036294 A1 | 11/2001 | Keskes et al. |
| 2002/0032550 A1 | 3/2002 | Ward et al. |
| 2002/0038201 A1 | 3/2002 | Balaven et al. |
| 2002/0099504 A1 | 7/2002 | Cross et al. |
| 2003/0018436 A1 | 1/2003 | Stark |
| 2003/0023383 A1 | 1/2003 | Stark et al. |
| 2003/0112704 A1 | 6/2003 | Goff et al. |
| 2003/0132934 A1 | 7/2003 | Fremming |
| 2003/0216897 A1 | 11/2003 | Endres et al. |
| 2004/0122640 A1 | 6/2004 | Dusterhoft |
| 2004/0153247 A1 | 8/2004 | Czernuszenko et al. |
| 2004/0193960 A1 | 9/2004 | Vassilev |
| 2004/0260476 A1 | 12/2004 | Borgos et al. |
| 2004/0267454 A1 | 12/2004 | Granjeon |
| 2005/0114831 A1 | 5/2005 | Callegari et al. |
| 2005/0203375 A1 | 9/2005 | Willis et al. |
| 2005/0216197 A1 | 9/2005 | Zamora et al. |
| 2006/0004522 A1 | 1/2006 | Cacas |
| 2006/0025976 A1 | 2/2006 | Kennon et al. |
| 2006/0122780 A1 | 6/2006 | Cohen et al. |
| 2006/0133206 A1 | 6/2006 | Barnes |
| 2006/0235666 A1 | 10/2006 | Assa et al. |
| 2006/0253759 A1 | 11/2006 | Wei |
| 2007/0024623 A1 | 2/2007 | Dugge |
| 2007/0118293 A1 | 5/2007 | Adams |
| 2007/0239414 A1 | 10/2007 | Song et al. |
| 2008/0088621 A1 | 4/2008 | Grimaud et al. |
| 2008/0109168 A1 | 5/2008 | Koren et al. |
| 2008/0232694 A1 | 9/2008 | Sulatycke |
| 2008/0243447 A1 | 10/2008 | Roggero et al. |
| 2008/0243452 A1 | 10/2008 | Bowers et al. |
| 2008/0273421 A1 | 11/2008 | Koren et al. |
| 2009/0070079 A1 | 3/2009 | Harada |
| 2009/0119076 A1 | 5/2009 | Madatov et al. |
| 2009/0119082 A1 | 5/2009 | Fitzpatrick et al. |
| 2009/0122060 A1 | 5/2009 | Porat et al. |
| 2009/0132170 A1 | 5/2009 | Krueger et al. |
| 2009/0157322 A1 | 6/2009 | Levin |
| 2009/0192717 A1 | 7/2009 | Iversen et al. |
| 2009/0204332 A1 | 8/2009 | Lomask et al. |
| 2009/0204377 A1 | 8/2009 | Wagoner et al. |
| 2009/0231955 A1 | 9/2009 | Barnes |
| 2009/0265152 A1 | 10/2009 | Cacas et al. |
| 2009/0303233 A1 | 12/2009 | Lin et al. |
| 2010/0053161 A1 | 3/2010 | Chuter |
| 2010/0156920 A1 | 6/2010 | Shin et al. |
| 2010/0223039 A1 | 9/2010 | Maliassov |
| 2010/0245347 A1 | 9/2010 | Dorn et al. |
| 2010/0250210 A1 | 9/2010 | Dorn et al. |
| 2010/0299117 A1 | 11/2010 | Bjerkholt |
| 2010/0332139 A1 | 12/2010 | Bruun et al. |
| 2011/0015910 A1 | 1/2011 | Ran et al. |
| 2011/0054857 A1 | 3/2011 | Moguchaya |
| 2011/0071799 A1 | 3/2011 | Slotte |
| 2011/0106507 A1 | 5/2011 | Lepage |
| 2011/0115787 A1 | 5/2011 | Kadlec |
| 2011/0120702 A1 | 5/2011 | Craig |

(56) References Cited

U.S. PATENT DOCUMENTS

| | | | |
|---|---|---|---|
| 2011/0264430 | A1 | 10/2011 | Tapscott et al. |
| 2011/0313745 | A1 | 12/2011 | Mezghani et al. |
| 2012/0037379 | A1 | 2/2012 | Hilliard et al. |
| 2012/0072116 | A1 | 3/2012 | Dorn et al. |
| 2012/0290274 | A1 | 11/2012 | Seningen |
| 2012/0318500 | A1 | 12/2012 | Urbancic et al. |
| 2013/0124161 | A1 | 5/2013 | Poudret et al. |
| 2013/0144532 | A1 | 6/2013 | Williams et al. |
| 2013/0211796 | A1 | 8/2013 | Aquelet |
| 2013/0231903 | A1 | 9/2013 | Li et al. |
| 2013/0231910 | A1 | 9/2013 | Kumar et al. |
| 2013/0238297 | A1 | 9/2013 | Lepage et al. |
| 2013/0246031 | A1 | 9/2013 | Wu et al. |
| 2013/0262052 | A1 | 10/2013 | Mallet et al. |
| 2013/0333483 | A1 | 12/2013 | Horoshenkov et al. |
| 2014/0076543 | A1 | 3/2014 | Ejofodomi et al. |
| 2014/0222403 | A1* | 8/2014 | Lepage ............... G01V 99/005 703/6 |
| 2015/0120262 | A1 | 4/2015 | Dulac et al. |
| 2015/0276979 | A1 | 10/2015 | Hugot et al. |
| 2016/0370482 | A1 | 12/2016 | Mallet et al. |
| 2018/0113971 | A1* | 4/2018 | Chakraborty ....... G06F 17/5068 |

FOREIGN PATENT DOCUMENTS

| | | |
|---|---|---|
| EP | 1 429 157 | 6/2004 |
| EP | 2 317 348 | 5/2011 |
| EP | 2 560 030 | 2/2013 |
| FR | 2 987 903 | 9/2013 |
| GB | 2 444 506 | 6/2008 |
| GB | 2 444 167 | 3/2011 |
| RU | 2 145 100 | 1/2000 |
| WO | WO 99/41676 | 8/1999 |
| WO | WO 03/009003 | 1/2003 |
| WO | WO 03/050766 | 6/2003 |
| WO | WO 2004/038654 | 5/2004 |
| WO | WO 2006/007466 | 1/2006 |
| WO | WO 2008/005690 | 1/2008 |
| WO | WO 2011/024161 | 3/2011 |
| WO | WO 2011/077227 | 6/2011 |
| WO | WO 2013/015764 | 1/2013 |
| WO | WO 2013/028237 | 2/2013 |

OTHER PUBLICATIONS

U.S. Appl. No. 15/271,389, filed Sep. 21, 2016, Mallet.
Bakker, "Image Structure Analysis for Seismic Interpretation," doctoral thesis, publicly defended on Jun. 4, 2002.
Carr et al., "Reconstruction and Representation of 3D Objects with Radial Basis Functions," ACM SIGGRAPH 2001, ACM Press New York, Computer Graphics Proceedings, pp. 67-76, 2001 (ISBN 1-58113-374-X).
Caumon et al. "Building and Editing a Sealed Geological Model," Mathematical Geology, vol. 36, No. 4, May 2004; pp. 405-424.
Caumon et al., "Elements for Stochastic Structural Perturbation of Stratigraphic Models," Proc. Petroleum Geostatistics, Sep. 10-14, 2007.
Chiles et al., "Modelling the Geometry of Geological Units and its Uncertainty in 3D From Structural Data: The Potential-Field Method," Orebody Modelling and Strategic Mine Planning, pp. 313-320, Nov. 22-24, 2004.
Chih-Ping, et al., "Flower Plot: A new tool for smart Survey Design", SEG Expanded Abstracts, Oct. 6, 2002, pp. 1-2.
Cignoni et al., "Multiresolution Representation and Visualization of Volume Data," IEEE Transactions on Visualizations and Computer Graphics; 3(4), Oct.-Dec. 1997; pp. 352-369.
Claerbout, "Fundamentals of Geophysical Data Processing with Applications to Petroleum Prospecting," Blackwell Scientific Publications, 1985.
Clawson et al., "The Value of 3D Seismic Attributes for Illuminating Deep Water Deposits by Seismic Forward Modeling of the Brushy Canyon Formation," 2003 SEG Annual Meeting, Oct. 26-31, 2003, Dallas, Texas (only Abstract submitted).
Courrioux et al., "3D Volumetric modelling of Cadomian Terranes (Northern Brittany, France): an automatic method using Voronoi diagrams," Tectonophysics 331(1-2), Feb. 2001, pp. 181-196.
Cremeens et al., "On Chronostratigraphy, Pedostratigraphy, and Archaeological Context," Soil Science Society of America, 1995.
Cuisenaire, "Distance Transformations: Fast Algorithms and Applications to Medical Image Processing," Laboratoire de Telecommunications et Teledetection; Oct. 1999.
Davies, "Conditioning Poorly Sampled Gathers for Pre and Post Stack Analysis," Journal of Conference Abstracts, 2002, vol. 7, No. 2, pp. 142-143.
De Groot et al., "How to create and use 3D Wheeler transformed seismic volumes," SEG/New Orleans 2006 Annual Meeting, pp. 1038-1042.
Dorn et al., "Chapter 13, Interpreting 3-D Seismic Data", The Leading Edge, Sep. 1998, pp. 1261-1272.
Dulac, "Advances in chrono-stratigraphic interpretation modeling," First Break, vol. 27, Oct. 2009.
Durand-Riard et al., "Balanced restoration of geological vols. with relaxed meshing constraints," Computers and Geosciences, vol. 36, No. 4, Apr. 1, 2010, pp. 441-452.
Eage Daily News, "Paradigm is Redefining Interpretation," 2011 EAGE Conference & Exhibition, May 2011.
Egan et al., "Three-Dimensional Modelling and Visualisation in Structural Geology: New Techniques for the Restoration and Balancing of Volumes", Proceeding of GIG Conference on Geological Visualisation—the Intelligent Picture?, British Geological Survey, Oct. 1996.
Escalona et al., Sequence-stratigraphic analysis of Eocene clastic foreland basin deposits in central Lake Maracaibo using high-resolution well correlation and 3-D seismic data, AAPG Bulletin, vol. 90, No. 4, pp. 581-623 (Apr. 2006) (only Abstract submitted).
Frank et al., "3D-reconstruction of Complex Geological Interfaces from Irregularly Distributed and Noisy Point Data," Computers & Geosciences 33 (2007) 932-943.
Frank, "Advanced Visualization and Modeling of Tetrahedral Meshes", Doctorat de l'Institut National Polytechnique de Lorraine; pp. 1-140; 2006.
"Geomodeling Releases VisualVoxAT™ 6.2 Software—Introducing the Geobody Paintbrush," New Release, Sep. 24, 2007, printed from http://www.geomodeling.com/news_22.htm; on Oct. 5, 2009.
Gibbons, "Seismic Applications Overview," Society of Petroleum Engineers, Aug. 2003, 9 pages.
GoCAD Suite 2.5 2007 User Guide: Parts 1-12, published Sep. 15, 2007.
Harris et al., "Fault Seal Risk Volumes—A New Tool for the Assessment of Reservoir Compartmentalisation" 71st EAGE Conference & Exhibition—Amsterdam, The Netherlands, Jun. 8-11, 2009.
Hasle 2007 (Geometric Modelling, Numerical Simulation, and Optimization: Applied Mathematics at SINTEF, Springer 2007).
Herrmann, et al., "Shot-Based Pre-Processing Solution for Wide Azimuth Towed Streamer Datasets", EAGE, First Break, vol. 25, Mar. 2007, pp. 71-76.
Jayr et al., "The Need for a Correct Geological Modelling Support: the Advent of the UVT-Transform," First Break, vol. 26, Oct. 2008, pp. 73-79.
Jentzsch et al., "Kinematic subsidence modelling of the Lower Rhine Basin," Netherlands Journal of Geosciences, vol. 81, No. 2, pp. 231-239 (2002).
Jones, "Data structures for three-dimensional spatial information systems in geology," Int. J. Geographical Information Systems, 3(1), 1989, pp. 15-30.
Labrunye et al., "New 3D flattened space for seismic interpretation," SEG Houston 2009 International Exposition and Annual Meeting, pp. 1132-1136.
Kass et al., "Snakes: Active Contour Models", International Journal of Computer Vision, Dordrecht, NL, Jan. 1, 1988, pp. 321-331, XP000675014.

(56) References Cited

OTHER PUBLICATIONS

Launay et al., "A flexible iterative method for 3D reconstruction from X-ray projections." Pattern Recognition, 1996, Proceedings of the 13th International Conference on. vol. 3. IEEE, 1996.
Ledez, "Modelisation D'Objets Naturals par Formulation lmplicite," Ecole Nationale Superieure de Geologie; Oct. 28, 2003; pp. 1-158, see English Abstract.
Lee et al., "Pitfalls in Seismic Data Flattening," The Leading Edge, Feb. 2001, pp. 161-164.
Lepage, "Generation de Maillages Tridimensionnels Pour la Simulation des Phenomenes Physiques en Geosciences," Ecole National Superieure de Geologie; Oct. 28, 2003; pp. 1-224, see English Abstract.
Lessenger et al., "An Inverse Stratigraphic Simulation Model: Is stratigraphic Inversion Possible?" Energy Exploration & Exploitation, vol. 14, No. 6, pp. 627-637 (1996) (only Abstract submitted).
Ligtenberg et al., "Sequence Stratigraphic Interpretation in the Wheeler Transformed (Flattened) Seismic Domain," EAGE 68th Conference & Exhibition—Vienna, Austria, Jun. 12-15, 2006.
Liwanag, "Reservoir Characterisation, Introducing geological processes in reservoir models," GEO ExPro Oct. 2005, pp. 28-32.
Lixin, "Topological relations embodied in a generalized tri-prism (GTP) model for a 3D geoscience modeling system," Computers & Geosciences 30(4), May 2004, pp. 405-418.
Lomask et al., "Flattening Without Picking," Geophysics, vol. 71, No. 4, pp. P13-P20, Jul.-Aug. 2006.
Lomask et al., "Flattening Without Picking," Stanford Exploration Project, Report 112, Nov. 11, 2002, pp. 141-150.
Lomask et al., "Update on Flattening Without Picking," Stanford Exploration Project, Report 120, May 3, 2005, pp. 137-159.
Lomask, "Flattening 3-D Seismic Cubes Without Picking," Jan. 8, 2004.
Mallet, "Discrete Smooth Interpolation in Geometric Modelling," Journal of Computer Aided Design, 24(4), 1992, pp. 178-191.
Mallet, "Numerical Earth Models," 2008 EAGE Publications, ISBN 978-90-73781-63-4, p. 147-157.
Mallet, "Space-Time Mathematical Framework for Sedimentary Geology," Journal of Mathematical Geology, vol. 36, No. 1, Jan. 2004, pp. 1-32.
Mallet, Geomodeling (Book chapter); Chapter 6; Oxford University Press; cover and preface pages and pp. 244-315, 2002.
Mallet, Geomodeling, Oxford University Press, Sep. 22, 2004 (ISBN 0-19-514460.0).
Mitchum et al., "Seismic Stratigraphy and Global Changes of Sea Level, Part 6: Stratigraphic Interpretation of Seismic Reflection Patterns in Depositional Sequences," accepted Jun. 13, 1977, pp. 117-133.
Monsen et al., "Geological process controlled interpretation based on 3D Wheeler diagram generation," SEG/San Antonio 2007 Annual Meeting, pp. 885-889.
Moretti et al., "KINE3D: a New 3D Restoration Method Based on a Mixed Approach Linking Geometry and Geomechanics," Oil & Gas Science and Techonology, Rev. IFP, vol. 61 (2006), No. 2, pp. 277-289.
Moyen et al., "3D-Parameterization of the 3D Geological Space—The Geochron Model," 9th European Conference on the Mathematics of Oil Recovery —Cannes, France, Geological Modelling I, Aug. 30-Sep. 2, 2004.
Moyen, "Paramétrisation 3D de L'espace en Géologie Sédimentaire: Le ModèGeochron Thèse," Doctorat de l'Institut National Polytechnique de Lorraine, Jun. 9, 2005 (original text in French and English translation).
Müller et al. "3D Restoration and mechanical properties," from structure.harvard.edu/projects/restoration, Harvard University Structural Geology and Earth Resources Group, 2005, accessed on Aug. 21, 2012.
O'Malley et al., "Towards Robust Structure-Based Enhancement and Horizon Picking in 3-D Seismic Data," Proceedings of the 2004 IEEE Computer Society Conference on Computer Vision and Pattern Recognition (CVPR '04), 2004, vol. 2, pp. 482-489.
OpendTect Workflows Documentation version 4.2, dGB Beheer B.V., dGB Earth Sciences, Copyright @ 2002-2010.
Oyedele, "3D High Resolution Seismic Imaging of Middle-Late Quaternary Depositional Systems, Southeast Green Canyon, Sigsbee Escarpment, Gulf of Mexico," Thesis presented to the Faculty of the Dept. of Geosciences at the University of Houston, Aug. 2005.
Paradigm™Skua™2009 User Guide: Part V Seismic Interpretation Modeling, Feb. 3, 2009.
Rouby et al., "3-D Restoration of Complexly Folded and Faulted Surfaces Using Multiple Unfolding Mechanisms," AAPG Bulletin, vol. 84, No. 6, pp. 805-829 (Jun. 2000).
Rumpf et al., "A Continuous Skeletonization Method Based on Level Sets," Joint Europgraphics—IEEE Symposium on Visualization, pp. 151-157 (2002).
Saito, "New Algorithms for Euclidean Distance Transformation of an n-Dimensional Digitized Picture with Applications," Pattern Recognition, 27(11) 1994; pp. 1551-1565.
Samson et al., "Quantifying the Impact of Structural Uncertainties on Gross-Rock Volume Estimates", SPE 35535, 1996, pp. 381-392.
Smith et al., "Susan—A New Approach to Low Level Image Processing," International Journal of Computer Vision, 1997, vol. 23, Iss. 1, pp. 45-78.
Souche, "Integration of fault models into unstructured grids and geo-chronological space," $24^{th}$ GOCAD Meeting, Jun. 2004.
Stark, "Generation of a 3D seismic 'Wheeler Diagram' from a high resolution Age Volume," pp. 782-786, submitted to the 75th Annual SEG Convention, Nov. 6-11, 2005, Houston, TX.
Stark, "Relative Geologic Time (Age) volumes—Relating Every Seismic Sample to a Geologically Reasonable Horizon," The Leading Edge, Sep. 2004, pp. 928-932.
Terraspark Geosciences, "Geoscience Interpretation Visualization Consortium (GIVC)," http://terraspark.com/GIVC.consort, accessed on May 11, 2006.
Tertois et al., "Editing faults within tetrahedral volume models in real time," In Jolley, S.J., Barr, D., Walsh, J.J. et al. (Eds), Structurally Complex Reservoirs, London, UK: Geological Society of London, Special Publications, 2007; v. 292; p. 89-101 (doi: 10.1144/SP292.5).
Tertois et al., Real-time Tetrahedral Volume Editing Accounting for Discontinuities; Ninth International Conference on Computer Aided Design and Computer Graphics (CAD/CG 2005) 2005 IEEE; pp. 1-6.
Tertois, "Création et édition de modèles géologiques par Champs de potentiel: Application au modele GeoChron—Thèse," Institut National Polytechnique de Lorraine, Jun. 21, 2007.
Tertois, Preserving Geological Information During Real-Time Editing of Faults in Tetrahedral Models; Int. Assoc. for Mathematical Geology Xlth International Congress Universite de Liege—Belgium; 2006; S14-24; pp. 1-4.
Thomsen et al., "Towards a balanced 3D Kinematic Model of a Faulted Domain—the Bergheim Open Pit Mine, Lower Rhine Basin," Netherlands Journal of Geoscience, vol. 81, No. 2, pp. 241-250 (2002).
Thore et al., Integration of Structural Uncertainties into Reservoir grid construction—70th EAGE Conference & Exhibition—Rome, Italy, Jun. 9-12, 2008.
Trudgill et al., "Integrating 3D Seismic Data with Structural Restorations to Elucidate the Evolution of a Stepped Counter-Regional Salt System, Eastern Louisiana Shelf, Northern Gulf of Mexico," pp. 165-176. (2004).
Volume Based Method (VBM) Horizon Modeler, http://support.software.slb.com/Knowledgebase/Pages/KBArticles/Pretrel/KB6327229.aspx, meta data indicates document created Dec. 10, 2013.
Wen et al., "Use of Border Regions for Improved Permeability Upscaling," Mathematical Geology, 35(5), Jul. 2003; pp. 521-547.
Wood et al., "Applying Sequence Stratigraphy and Seismic Stratal Slice Technology in the Gulf of Mexico," GASTIPS, Lang et al. (Eds.), Winter 2003, vol. 9, No. 1, pp. 10-21.
Zeng et al., High-frequency Sequence Stratigraphy from Seismic Sedimentology: Applied to Miocene, Vermilion Block 50, Tiger Shoal Area Offshore Louisiana, AAPG Bulletin, Feb. 2004, vol. 88, No. 2, pp. 153-174 (only Abstract submitted).

(56) References Cited

OTHER PUBLICATIONS

Zeng et al., "Interpretive Advantages of 90 Degree-Phase Wavelets: Part 2—Seismic Applications," Geophysics, SEG, vol. 70, No. 3, May 2005-Jun. 2005. pp. C-17-C-24.
Zeng et al., "Seismic Frequency Control on Carbonate Seismic Stratigraphy: A Case Study of the Kingdom Abo Sequence, West Texas," AAPG Bulletin, vol. 87, Issue No. 2, pp. 273-293 (2003) (only Abstract submitted).
Zeng et al., "Stratal Slicing of Miocene-Pliocene Sediments in Vermilion Block 50-Tiger Shoal Area, Offshore Louisiana," The Leading Edge, Offshore Technology Special Section, vol. 20, No. 4, Apr. 2001, pp. 408-418.
Zeng et al., "Stratal Slicing, Part I and II: Read 3-D Seismic Data," Geophysics, vol. 63, No. 2 (Mar.-Apr. 1998); pp. 502-522.
Zeng et al., "Three-D Seismic Facies Imaging by Stratal Slicing of Miocene-Pliocene Sediments in Vermilion Block 50-Tiger Shoal Area, Offshore Louisiana," Secondary Gas Recovery, AAPG 2000.
Zeng, "From Seismic Stratigraphy to Seismic Sedimentology: A Sensible Transition," GCAGS Transactions, vol. 51, pp. 413-420 (2001) (only Abstract submitted).
Zeng, "Stratal Slicing: Benefits and Challenges," The Leading Edge 29, 1040 (Sep. 2010).
Zeng et al., "Stratal Slicing and Seismic Facies Imaging," Bureau of Economic Geology, The University of Texas at Austin, 1998. (only Abstract submitted).
Office Action issued for U.S. Appl. No. 11/628,559, dated Jun. 24, 2009.
Notice of Allowance issued for U.S. Appl. No. 11/628,559, dated Dec. 24, 2009.
Notice of Allowance issued for U.S. Appl. No. 12/791,352 dated Dec. 6, 2013.
Office Action issued for U.S. Appl. No. 12/791,370, dated Nov. 26, 2012.
Notice of Allowance issued for U.S. Appl. No. 12/791,370, dated Jul. 22, 2013.
Office Action issued for U.S. Appl. No. 12/791,483, dated Aug. 17, 2012.
Office Action issued for U.S. Appl. No. 12/909,981 dated Aug. 19, 2013.
Notice of Allowance issued for U.S. Appl. No. 12/909,981 dated Jan. 27, 2014.
Office Action issued for U.S. Appl. No. 14/059,099, dated Jun. 16, 2014.
Notice of Allowance issued for U.S. Appl. No. 14/059,099, dated Oct. 21, 2014.
Office Action issued for U.S. Appl. No. 14/065,713, dated Jun. 19, 2014.
Notice of Allowance issued for U.S. Appl. No. 14/065,713, dated Oct. 20, 2014.
Office Action issued for U.S. Appl. No. 14/189,505, dated Dec. 4, 2014.
Notice of Allowance issued for U.S. Appl. No. 14/260,760, dated May 22, 2015.
Notice of Allowance issued for U.S. Appl. No. 14/189,505, dated Sep. 3, 2015.
Office Action issued for U.S. Appl. No. 14/260,760, dated Jul. 9, 2014.
Final Office Action issued for U.S. Appl. No. 14/260,760, dated Nov. 14, 2014.
Final Office Action issued for U.S. Appl. No. 14/260,760, dated Nov. 25, 2014.
Office Action issued for U.S. Appl. No. 14/211,744, dated Jun. 3, 2014.
Ravve el al., "Spherical gridding in seismic imaging," SEG Technical Program Expanded Abstracts, Sep. 23, 2009, (pp. 2388-2392, XP055129074.
Office Action issued for U.S. Appl. No. 13/461,361 dated Aug. 4, 2015.
Notice of Allowance issued for U.S. Appl. No. 12/042,417 dated Aug. 7, 2015.
Office Action issued for U.S. Appl. No. 14/211,744 dated Jan. 14, 2016.
Office Action issued for U.S. Appl. No. 13/862,680 dated Dec. 21, 2015.
Advisory Action issued for U.S. Appl. No. 14/211,744 dated Dec. 17, 2015.
Office Action issued for U.S. Appl. No. 14/743,118 dated Dec. 4, 2015.
Office Action issued for U.S. Appl. No. 13/836,502 dated Nov. 25, 2015.
Office Action issued for U.S. Appl. No. 14/605,152 dated Nov. 16, 2015.
Final Office Action issued for U.S. Appl. No. 13/458,264 dated Oct. 30, 2015.
Corrected Notice of Allowance issued for U.S. Appl. No. 14/860,084 dated Feb. 22, 2016.
Final Office Action issued for U.S. Appl. No. 14/211,744 dated Sep. 14, 2015.
Notice of Allowance issued for U.S. Appl. No. 14/260,778 dated Feb. 9, 2016.
Notice of Allowance issued for U.S. Appl. No. 14/860,084 dated Feb. 1, 2016.
Final Office Action issued for U.S. Appl. No. 13/461,361 dated Feb. 1, 2016.
Oil-Gas SKUA—A Step Change in Modeling, 3D Modeling, Scandinavian Oil—Gas Magazine No. 9/10, 2008.
Zhao, "Based on three-dimensional geological modeling of geological section", School of Computer Science and Technology, 2011 IEEE, pp. 263-266.
Edelstein-Keshet, "Integral Calculus: Mathematics 103", University of British Columbia (Jan. 2, 2010), pp. 61-80.
Field, "Some Advantages of the Logarithmic Scale in Statistical Diagrams", Journal of Political Economy, vol. 25, No. 8, Oct. 1917, pp. 805-841.
Muttalib, "PHZ3113 Notes", Scalar Fields, Nov. 5, 2007.
Final Office Action issued for U.S. Appl. No. 14/743,118 dated Apr. 22, 2016.
Notice of Allowance issued for U.S. Appl. No. 14/605,152 dated Mar. 21, 2016.
Notice of Allowance issued for U.S. Appl. No. 13/836,502 dated Apr. 11, 2016.
Final Office Action issued for U.S. Appl. No. 14/211,744 dated May 4, 2016.
Notice of Allowance issued for U.S. Appl. No. 14/211,744 dated Jun. 22, 2016.
Notice of Allowance issued for U.S. Appl. No. 13/862,680 dated May 5, 2016.
Office Action issued for U.S. Appl. No. 13/458,264 dated May 13, 2016.
Notice of Allowance issued for U.S. Appl. No. 14/260,778 dated May 25, 2016.
Office Action issued for U.S. Appl. No. 14/987,158 dated May 16, 2016.
Gringarten, et al., New Grids for Robust Reservoir Modeling, SPE 116649, 2008, pp. 1-11.
Office Action issued for U.S. Appl. No. 14/189,505, dated May 21, 2015.
Zhai, The Computer Mouse and Related Input Devices, Manuscript Version 6. Official copy "Mouse" in Berkshire Encyclopedia of Human-Computer Interaction, W.S. Bainbridge (ed). 2004, pp. 1-6.
Notice of Allowance issued for U.S. Appl. No. 14/987,158 dated Aug. 31, 2016.
Office Action issued for U.S. Appl. No. 14/312,018 dated Aug. 17, 2016.
Office Action issued for U.S. Appl. No. 14/743,118 dated Sep. 9, 2016.
Notice of Allowance issued for U.S. Appl. No. 13/461,361 dated Sep. 12, 2016.
Office Action issued for U.S. Appl. No. 15/166,438 dated Oct. 28, 2016.
Final Office Action issued for U.S. Appl. No. 13/458,264 dated Oct. 31, 2016.

(56) References Cited

OTHER PUBLICATIONS

Notice of Allowance issued for U.S. Appl. No. 14/743,118 dated Jan. 27, 2017.
Yang et al.,"Sediments, Facies Tracts, and Variations in Sedimentation Rates of Holocene Platform Carbonate Sediments and Associated Deposits, Northern Belize—Implications for Representative" Sedimentation Rates; Journal of Sedimentary Research, vol. 74, No. 4, Jul. 2004, p. 498-512.
Office Action issued for U.S. Appl. No. 14/211,744 dated Feb. 24, 2015.
Caumon et al., "Surface-Based 3D Modeling of Geological Structures", 2009, Mathematical Geosciences, vol. 41, pp. 927-945.
Calcagno et al., "Geological Modelling from Field Data and Geological Knowledge Part I. Modelling Method Coupling 3D Potential-Field Interpolation and Geological Rules", 2008, Physics of the Earth and Planetary Interiors, vol. 171, pp. 147-157.
Admasu el al., "Automatic Method for Correlating Horizons across Faults in 3D Seismic Data", 2004, Proceedings of the 2004 IEEE Computer Society Conference on Computer Vision and Pattern Recognition, pp. 1-6.
Mcinerney et al., "Improved 3D Geology Modelling using an Implicit Function Interpolator and Forward Modelling of Potential Field Data". 2007, Proceedings of Exploration 07: Fifth Decennial International Conference on Mineral Exploration, pp. 919-922.
Office Action issued for U.S. Appl. No. 13/461,361 dated Dec. 16, 2014.
Barbosa et al., "Gravity Inversion of Basement Relief using Approximate Equality Constraints on Depths", 1997, Geophysics, vol. 62, No. 6, pp. 1745-1757.
Medeiros et al., "Geophysical Inversion using Approximate Equality Constraints", 1996, Geophysics, vol. 61, No. 6, pp. 1678-1688.
Final Office Action issued for U.S. Appl. No. 13/461,361 dated Apr. 15, 2015.
Durlofsky, "Upscaling and Gridding of Fine Scale Geological Models for Flow Simulation", 8th International Forum on Reservoir Simulation, Iles Borromees, Stresa, Italy, Jun. 20-24, 2005, pp. 1-59.
Prevost et al., Unstructured 3D Gridding and Upscaling for Coarse Modeling of Geometrically Complex Reservoirs, 9th European Conference on the Mathematics of Oil Recovery—Cannes, France, Aug. 30-Sep. 2, 2004, pp. 1-8.
Voller, "Basic Control Volume Finite Element Methods for Fluid and Solids", IISc Research Monographs Series, 2009.
Office Action issued for U.S. Appl. No. 13/458,264 dated Apr. 22, 2015.
Zhang, el al. "Percolation-theory and fuzzy rule-based probability estimation of fault leakage at geologic carbon sequestration sites", pp. 1447-1459, published online Mar. 18, 2009.
Paradigm Geotechnology: GOCAD Suite 2.5 User Guide: Part VIII 3D Grid Building: pp. 1-284; Jan. 2008.
Supplemental Notice of Allowability issued for U.S. Appl. No. 12/791,370 dated Sep. 6, 2013.
Gerstner, Fast Multiresolution Extraction of Multiple Transparent Isosurfaces, 2001, in Data Visualization 2001, editor D.S. Ebert et al., Springer-Verlag, pp. 35-44.
Notice of Allowability issued for U.S. Appl. No. 14/743,118 dated Feb. 17, 2017.
Tertois et al., Fault uncertainty and ranking in tetrahedral models, 27th GOCAD-Meeting, Nancy, France, Jun. 2007, pp. 1-8.
Notice of Allowability issued for U.S. Appl. No. 14/312,018 dated Mar. 7, 2017.
Notice of Allowability issued for U.S. Appl. No. 15/166,438 dated Mar. 24, 2017.
Office Action issued for U.S. Appl. No. 15/271,389 dated Mar. 24, 2017.
Mallet, Jean-Laurent. Elements of Mathematical Sedimentary Geology: the GeoChron Model. Houten, The Netherlands: EAGE Publications, 2014. (Excerpt, pp. 56-57).

* cited by examiner

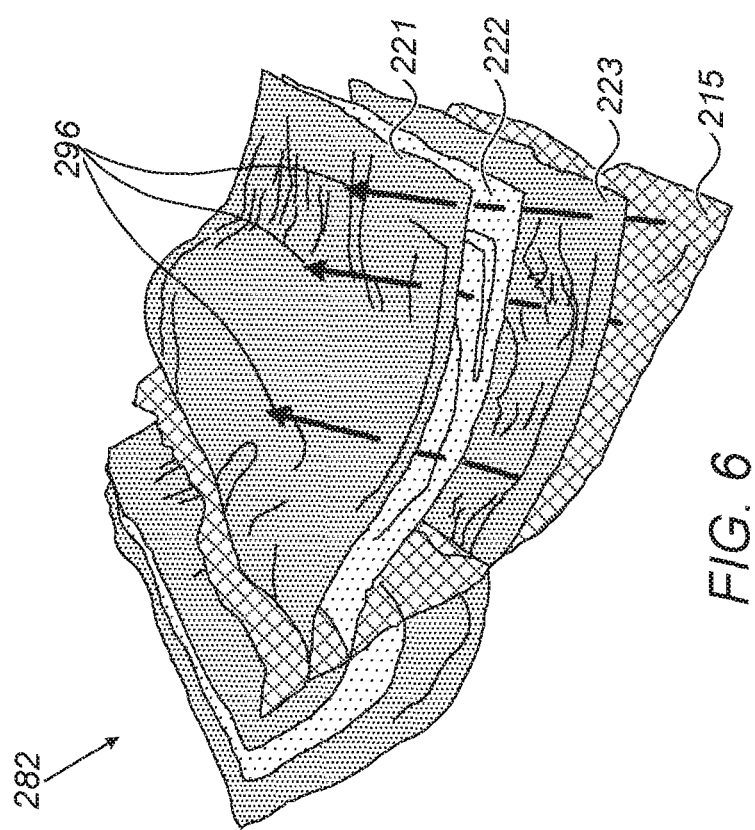
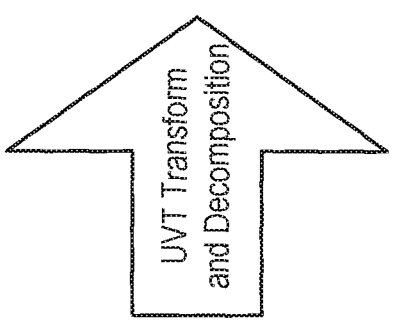
FIG. 6

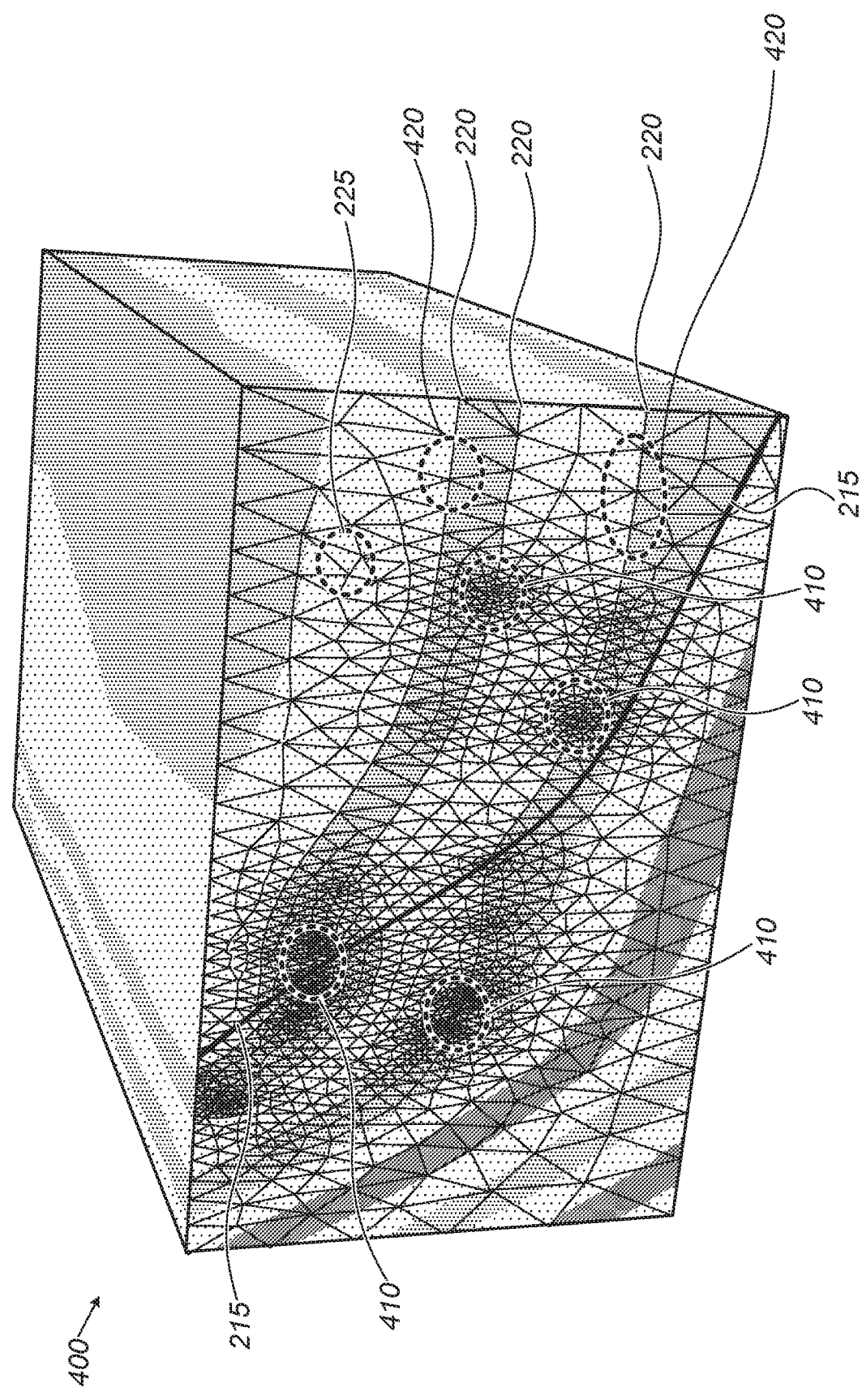

SYSTEM AND METHOD FOR EDITING GEOLOGICAL MODELS BY SWITCHING BETWEEN VOLUME-BASED MODELS AND SURFACE-BASED STRUCTURAL MODELS AUGMENTED WITH STRATIGRAPHIC FIBER BUNDLES

FIELD OF EMBODIMENTS OF THE INVENTION

Embodiments of the present invention pertain to the general field of geological modeling of stratified terrains in a subsurface region of the Earth. More specifically, embodiments of the present invention relate to editing geological models.

BACKGROUND OF THE INVENTION

Geological models are used to image regions of the Earth's subsurface, for example, in applications related to the oil and gas industry. In geological modeling, a geological region may be represented by a "surface-based" model or a "volume-based" model. A surface-based model may include a plurality of independently controllable surfaces of horizons and/or faults (e.g., with no interconnecting mesh between surfaces). A volume-based model may include surfaces with a 3D volumetric grid or mesh interconnecting the different geological surfaces.

Volume-based models are generally more efficient than surface-based models for executing flow and/or geomechanical simulations (e.g., used to determine petrophysical properties, such as porosity and permeability of the layers of the models) because volume-based models implicitly generate a plurality of horizons simultaneously and automatically ensure the horizons do not overlap, whereas surface-based models generate horizons one-at-a-time and cannot automatically prevent overlapping layers. However, surface-based models are generally more efficient than volume-based models for locally editing the models, for example, when simulation results differ from actual geological measurements. In surface-based models, control nodes are independently controllable so local edits remain generally contained within a single surface or defined region of a surface. In contrast, nodes of volume-based models are interconnected via a volumetric mesh, so local edits generally permeate throughout the entire model and require a global remodeling to unify the local edit to the remaining regions of the mesh.

Accordingly, there is a longstanding need in the art to gain the benefits of both surface-based and volume-based models.

SUMMARY OF EMBODIMENTS OF THE INVENTION

There is provided, in accordance with some embodiments of the present invention, a device, system, and method for editing a volume-based model imaging geological structures. An initial volume-based model may be received including a volumetric mesh. Updated geological data may be received defined within a region of the model. The volume-based model may be decomposed by converting the volumetric mesh into a plurality of surface meshes linked by a plurality of stratigraphic fibers to generate a surface-based model. The defined region of the surface-based model may be edited by editing positions of a plurality of control nodes of the surface meshes along the plurality of stratigraphic fibers in the defined region of the model so as to fit the updated geological data. The plurality of stratigraphic fibers may be updated, for example, by updating the geological time, based on the edited positions of the plurality of control nodes so as to fit the updated geological data. The edited surface-based model may be meshed to generate an updated volume-based model comprising a volumetric mesh defined by the edited positions of the control nodes. The updated volume-based model may be stored and/or displayed.

In accordance with some embodiments of the present invention, the initial volume-based model may be received by first receiving an initial surface-based model, and meshing the initial surface-based model to convert into the initial volume-based model.

In accordance with some embodiments of the present invention, an initial paleo-depositional transform of the meshed initial surface-based model may be computed to generate a geological time of approximate time periods when particles of sediment were originally deposited to define the stratigraphy of surfaces in the initial volume-based model.

In accordance with some embodiments of the present invention, the plurality of stratigraphic fibers may include Iso-Paleo-Geological (IPG) lines having constant paleo-depositional coordinates and varying in geological time.

In accordance with some embodiments of the present invention, an invalid stratigraphic fiber from the plurality of stratigraphic fibers may be identified when the edited position of a control node along the stratigraphic fiber crosses to a different edited surface than initially positioned.

In accordance with some embodiments of the present invention, the identified invalid stratigraphic fibers may be repaired by constructing an intermediate volume-based model over one or more error zones that include the identified invalid stratigraphic fibers, computing a paleo-depositional transform of the intermediate volume-based model to extract a plurality of horizon surfaces and a plurality of stratigraphic fibers to generate a surface-based representation to fix the error zones.

In accordance with some embodiments of the present invention, the plurality of stratigraphic fibers may be updated by using an arc-length parametrization between the edited positions of the plurality of control nodes when the updated plurality of stratigraphic fibers includes uniform layering between pairs of horizon surfaces.

In accordance with some embodiments of the present invention, the plurality of stratigraphic fibers may be updated by adding secondary control nodes along the plurality of stratigraphic fibers at positions intersecting one or more intra-formational horizon surfaces in the updated geological data and interpolating along segments of the plurality of stratigraphic fibers adjacent to the added secondary nodes.

There is further provided, in accordance with some embodiments of the present invention, a device, system and method for editing a volume-based model imaging geological structures. An initial volume-based model may be received having initial geological data defined by a volumetric mesh including 3D cells. Updated geological data may be received defined within a region of the model. The volume-based model may be converted into a surface-based model of the initial geological data defined by a plurality of distinct surface meshes including 2D cells that form a plurality of horizon and fault surfaces linked by a plurality of 1D stratigraphic fibers defining the stratigraphic spacing between surfaces. The defined region of the surface-based model may be edited by editing the positions of a plurality of control nodes at the intersections of the 2D cells and the 1D stratigraphic fibers to conform to the updated geological data in the defined region of the model. The edited surface-based model of edited 2D cells and edited 1D stratigraphic fibers may be converted into an updated volume-based model of edited 3D cells. The updated volume-based model is stored.

In accordance with some embodiments of the present invention, the initial volume-based model may be received by receiving an initial surface-based model and meshing the initial surface-based model to convert into the initial volume-based model.

In accordance with some embodiments of the present invention, an invalid 1D stratigraphic fiber from the plurality of 1D stratigraphic fibers may be identified when the edited position of a control node along the 1D stratigraphic fiber crosses to a different edited surface than initially positioned.

In accordance with some embodiments of the present invention, the identified invalid 1D stratigraphic fibers may be repaired by constructing an intermediate volume-based model over one or more error zones that include the identified invalid 1D stratigraphic fibers, computing a paleo-depositional transform of the intermediate volume-based model by extracting a plurality of repaired horizon surfaces and a plurality of repaired 1D stratigraphic fibers to generate a surface-based representation to fix the error zones.

In accordance with some embodiments of the present invention, the plurality of edited 1D stratigraphic fibers based on the edited positions of the plurality of control nodes may be updated by using arc-length parametrization between the edited positions of the plurality of control nodes when the updated geological data includes uniform layering between pairs of horizon surfaces.

In accordance with some embodiments of the present invention, the plurality of edited 1D stratigraphic fibers based on the edited positions of the plurality of control nodes may be updated by adding secondary control nodes along the plurality of stratigraphic fibers at positions intersecting one or more intra-formational horizon surfaces in the updated geological data and interpolating segments of the plurality of stratigraphic fibers adjacent to the added secondary nodes.

In accordance with some embodiments of the present invention, the surface-based model may be locally edited by editing the plurality of control nodes within a 2D sub-surface of the surface meshes and intersecting 1D line segments of the stratigraphic fibers.

One or more processors may be used to execute methods disclosed herein for editing a volume-based model imaging geological structures, one or more memories may be used to store the updated volume-based model, and/or one or more displays may be used to visualize an image of the edited surface based model and/or updated volume-based model.

BRIEF DESCRIPTION OF EMBODIMENTS OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

FIG. 1 schematically illustrates a system for editing an image of geological structures by switching between volume-based and surface-based models, in accordance with some embodiments of the present invention;

FIG. 2A schematically illustrates an initial volume-based model, in accordance with some embodiments of the present invention;

FIG. 2B schematically illustrates input geological data used to edit a defined region of an initial volume-based model, in accordance with some embodiments of the present invention;

FIG. 3A schematically illustrates a volume-based model with a stratigraphic fiber defining stratigraphic layering, in accordance with some embodiments of the present invention;

FIG. 3B schematically illustrates a paleo-depositional representation of a portion of a volume-based model in a transformed domain including three distinct horizons and a fault, in accordance with some embodiments of the present invention;

FIG. 3C schematically illustrates a surface-based structural model generated by decomposing an initial volume-based model, in accordance with some embodiments of the present invention;

FIG. 4A schematically illustrates a surface-based model with initial geological data, in accordance with some embodiments of the present invention;

FIG. 4B schematically illustrates an edited surface-based model with updated geological data within a defined region and initial geological data outside of the defined region, in accordance with some embodiments of the present invention;

FIG. 5 schematically illustrates an edited surface-based model with sealed fault-horizon surface contacts, in accordance with some embodiments of the present invention:

FIG. 6 illustrates an edited surface-based model with updated stratigraphic fibers, in accordance with some embodiments of the present invention;

FIG. 7A schematically illustrates an edited surface-based model with two stratigraphic fibers, in accordance with some embodiments of the present invention;

FIG. 7B schematically illustrates a surface-based model with two stratigraphic fibers cutting through primary or reference horizon surfaces and intra-formational horizon surfaces, in accordance with some embodiments of the present invention;

FIG. 7C schematically illustrates a surface-based model with two stratigraphic fibers cutting an intra-formational horizon surface, in accordance with some embodiments of the present invention;

FIG. 8 schematically illustrates an updated volume-based model, in accordance with some embodiments of the present invention;

DETAILED DESCRIPTION OF EMBODIMENTS OF THE INVENTION

Figure 1:
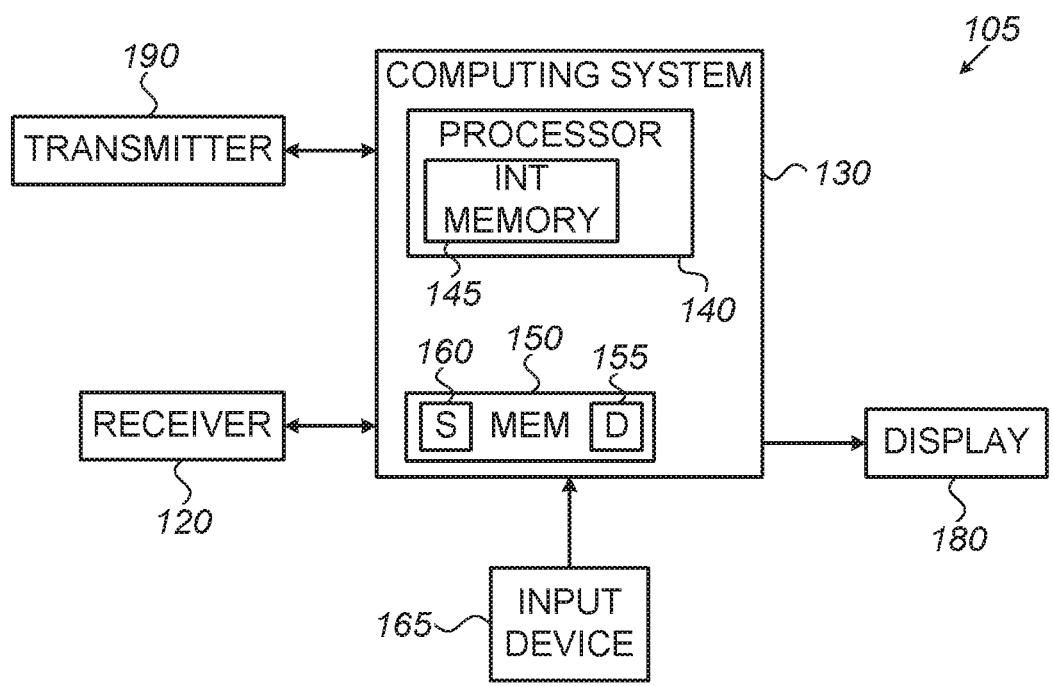

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Geological models, or computerized image representations of portions of the Earth's crust, may be generated using data such as seismic, geological and/or petrophysical measurements of geological layer strata and geological structures such as faults and horizons. The data may be based on measurements recording the reflection of acoustic or other waves at boundaries between layers within the Earth's subsurface. The waves may be emitted by a set of source devices and recorded by a set of receiver devices. Geological models may include, for example, a grid size and mesh specification, a geometric description of horizons and faults, and/or a 3D distribution of permeability and porosity in the rock layers in the geological strata. The geological models may then be used, for example, for property modeling, in which the different rock properties are spatially represented and mapped at each point or mesh node of the 3D grid.

These geological models may then be exported as inputs to a variety of simulators, such as flow and/or geomechanical simulators. Flow simulations may include reservoir simulations on a smaller scale, and basin simulation and modeling on a larger scale. Petrochemical parameters of the reservoir such as the hydrocarbon content volume and potential hydrocarbon yield in reservoirs may then be computed for evaluating hydrocarbon recovery. Ultimately improving the accuracy of these simulations may improve the success of exploration and production of hydrocarbon extracted from the modeled reservoirs.

The geological model including geological strata, horizons, faults and other subsurface structure may be represented in a present-day geological space, for example, using a Cartesian XYZ coordinate system. One approach to solving computational difficulties such as slow processing speeds due to complex and irregular subsurface geometries has been to apply a paleo-geological transform, for example, a UVT transform, to transform the present-day geological model (e.g., XYZ coordinates) into a paleo-geographic or depositional model (e.g., UVT coordinates) representing predicted approximate positions of particles of sediment deposited at a time period when the layer was originally formed. Instead of cutting or dividing the current or present-day geological model along fault and horizon lines, the paleo-geological transform converts the present-day geological model (e.g., in the XYZ coordinate system) into a past or paleo-depositional model (e.g., in a UVT coordinate system) and cuts the past paleo-depositional model along transformed fault and horizon lines.

The paleo-depositional model may represent an estimated state of the geological structure at a time period when the geological structure was originally formed. The vertical depth coordinate of the paleo-depositional model may measure the time period, t, of deposition. Since each horizon was generally deposited at approximately the same geological time (e.g., within a one to ten thousand year geological period), the horizon has a single constant depth coordinate (t) and therefore may be represented as a planar surface in the paleo-depositional model. Accordingly, the transformation or conversion from the present-day geological model (e.g., in XYZ space) to the paleo-depositional model (e.g., in UVT space) may flatten horizons from complex structures into flat, horizontal, or planar surfaces (e.g., iso-t surfaces).

Applying the paleo-geological transform to the present-day geological model may smooth or eliminate sharp, complex, or small-angle geometries normally found in the present-day (e.g., XYZ) coordinate system representation of the geological model. The computational speed, efficiency and convergence of simulators may thus be improved when computing different petrophysical metrics using the equivalent paleo-depositional (e.g., UVT) coordinate system for a given geological model. The paleo-geological transform is further described in U.S. Patent Publication No. 2013/0231903, filed Apr. 27, 2012, which is incorporated herein by reference in its entirety.

Different simulators, for example, may be designed to use geological models based on a volume-based model and/or a surface-based model. Volume-based modeling may use geological models with 3D-polyhedral mesh elements such as for example tetrahedra. Volume-based models may include a present-day (e.g., XYZ) geological model with a polyhedral mesh and/or an equivalent depositional (e.g., UVT) model (e.g., related via a UVT transform). 2D surfaces of surface-based models may be represented by polygonal (e.g., triangular) mesh elements. Surface based models may treat, for example, each of the horizons with a polygon mesh in the geological model by the model.

Volume-based models may use less memory and may be more computationally efficient than surface-based models when used in simulators, for example, to determine various material properties or petro-physical metrics, since the simulator may simultaneously process all horizon and fault surfaces in a volume-based model. Volume-based models also ensure that horizons do not intersect each other within a stratigraphic sequence.

Figure 2B:
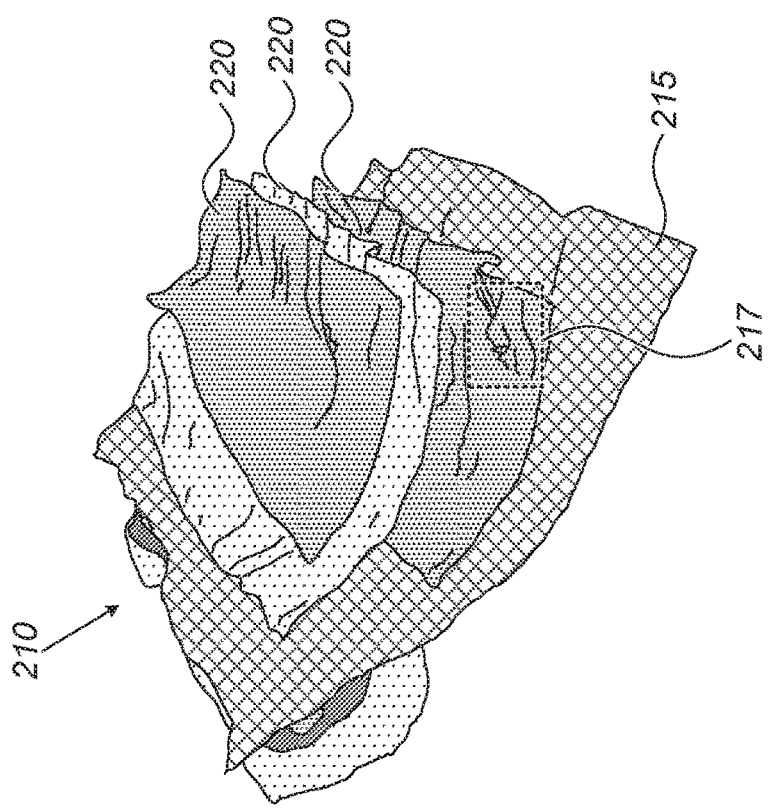
Figure 5:
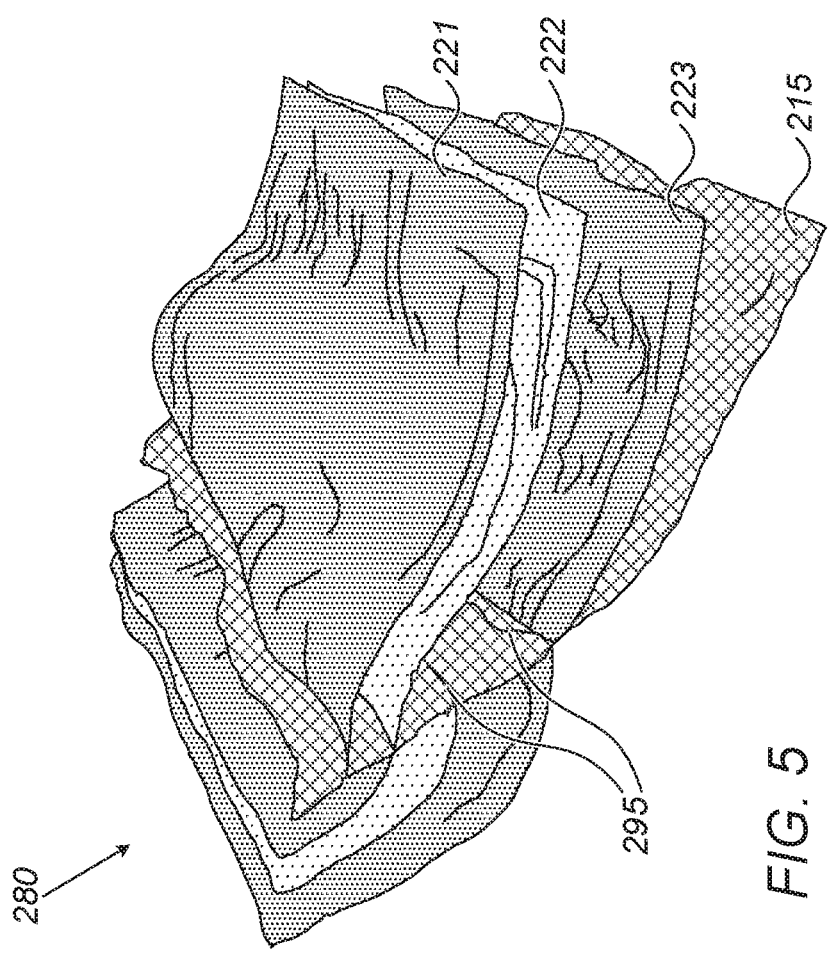

Volume-based models representing a particular region of the Earth may need to be updated with new geological data, for example, seismic data in a defined region of the model. New interpretations of the seismic data may replace the initial interpretations of the seismic data within a defined region of the model revealing a change in the geometry and topology of the horizon, faults and/or other geological stratigraphic layering. New interpretations of the seismic data may define an improved surface patch texture or topology (e.g., as shown in FIG. 2B) or an intersection between a horizon and fault (e.g., as shown in FIG. 5) within the defined region of the model. The initial volume-based model may be updated with the new geological data so as to improve model accuracy of the geological region in subsequent simulations.

In some embodiments of the present invention, a surface-based model may be generated from the volume-based model to represent each surface independently, without interconnection by a 3D polyhedral mesh between surfaces. Bundles of a plurality of 1D stratigraphic fibers each with control nodes forming the vertices of 2D surface polygonal (e.g., triangular) cells or mesh elements, for example, define the fault and horizon surfaces in the model. The control nodes may be moved independently of other surfaces to locally edit a defined region in accordance with the new geological data (e.g. input geological data). The local changes of the surface-based model to the new geological data edited within the defined region may be contained within the local defined region and may not propagate outside the defined region, for example, to other surfaces or globally throughout the geological model.

In contrast, editing a defined region using the volume-based models, for example, by moving nodes of the polyhedra to accommodate the shifts in the subsurface strata, may propagate local changes throughout the mesh outside the defined region, globally or to other surfaces. The horizons are iso-surfaces in a volume-based model with no physical nodes on these surfaces to modify. Editing the horizon surface within the defined region may be performed by modifying the values defined on the nodes of the polyhedral (e.g., tetrahedral) mesh of the volume-based model such that the iso-surfaces may change accordingly. In addition, editing a defined region in the present-day (e.g., XYZ coordinate) volume-based model may also alter the corresponding depositional (e.g., curvilinear UVT coordinate) model, or vice versa. For example, when a horizon is reshaped in the volume-based model in the present-day or depositional models, the transform there between is changed. Stated differently, to accommodate the new seismic interpretations and well measurements, the values at the nodes of the mesh in the depositional model may be updated to accommodate the new seismic interpretations and well measurements data in the defined region of the present-day geological model.

As substantially all nodes of a volume-based model are interconnected by a mesh, modifying a local defined region with new geological structural data, for example, from geological measurements such as seismic interpretations and well measurements, may propagate changes throughout the mesh, resulting in limited and non-intuitive user control over shape, resolution, and fit of the model to seismic interpretations and well data. If there are pre-existing structural models, it may be difficult to fully honor user-defined structural interpretations with the pre-existing structural model. Further, if the new data from the seismic and well measurements have relatively high resolution with relatively fine details, e.g., as compared to initial model data, it may be difficult to incorporate the new data into the volume-based model since the volume-based modeling may be incompatible with an incremental modeling workflow.

Embodiments of the present invention provide a device, system and method for updating a defined region of an initial volume-based model by switching to a surface-based model, editing the defined region with new geological data, and reverting back to the volume-based model.

The updated model may have new or edited geological data, such as a new horizon or fault surface patch or a new intersection surface between a fault and horizon, or other edits within the defined region, while the same initial data may remain in the remainder of the model outside the defined region. For example, the updated model may improve the resolution within a defined region, for example, incorporating new seismic interpretations and/or well data, while keeping a relatively low resolution mesh unchanged outside of the defined region. After the defined region has been edited, the model may be globally interpolated to re-apply the mesh to transform the updated surface-based model back into a volume-based model that has been locally edited. The defined region may include a sub-region or local region of the model, or may include the entire model. In the latter case, the entire model may be updated using the same flow described herein.

The edited volume-based model may be input into computer executed processes to generate improved property models, or in velocity modeling and seismic interpretation workflows. Switching back and forth between surface-based and volume-based models, according to embodiments of the invention, may provide the benefits of increased speed and efficiency afforded by intuitive editing in the surface-based model space, as well as increased speed and efficiency afforded by running processes in the volume-based space.

FIG. 1 schematically illustrates a system 105 for editing an image of geological structures by switching between volume-based and surface-based models, in accordance with some embodiments of the present invention. System 105 may include a transmitter 190, a receiver 120, a computing system 130 and a display 180.

Transmitter 190 may transmit output signals, for example, acoustic waves, compression waves or other energy rays or waves, that may travel through geological (e.g., below land or sea level) structures. The transmitted signals may become incident signals that are incident to geological structures. The incident signals may reflect at various transition zones or geological discontinuities throughout the geological structures. The output frequency, wavelength and intensity of the seismic signals by transmitter 190 may be controlled by a computing system, e.g., computing system 130 or another computing system separate from or internal to transmitter 190.

Receiver 120 may accept reflected signal(s) that correspond or relate to incident signals, sent by transmitter 190.

Transmitter 190 and receiver 120 made transmit/receive signals for making log-well measurements, where measurement equipment with transmitter 190, receiver 120, or both is lowered into a wellbore.

Computing system 130 may include, for example, any suitable processing system, computing system, computing device, processing device, computer, processor, or the like, and may be implemented using any suitable combination of hardware and/or software. Computing system 130 may include for example one or more processor(s) 140, memory 150 and software 160. Data 155 generated by reflected signals, received by receiver 120, may be transferred, for example, to computing system 130. The data may be stored in the receiver 120 as for example digital information and transferred to computing system 130 by uploading, copying or transmitting the digital information. Processor 140 may communicate with computing system 130 via wired or wireless command and execution signals.

Memory 150 may include cache memory, long term memory such as a hard drive or disk, and/or external memory external to processor 140, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Memory 150 may store data 155 and instructions (e.g., software 160 such as instructions for the processor to perform the meshing of cells along boundary topologies of interesting horizons with faults in a geological model as described herein), which when executed perform embodiments of the invention. Data 155 may include, for example, raw seismic data collected by receiver 120, instructions for partitioning a 3D mesh, grid or other arrangement into polyhedron, instructions for building a model, instructions for converting or transforming (and inverse transforming) a model between a present-day geological model and a past paleo-depositional model, a present-day geological model (including, for example, a set of sub-mesh parts each including present-day geological data), a volume-based model, or a surface-based model. When discussed herein, manipulating geological data, such as the operations for calculating, forming, cutting, dividing, etc., cells or sub-meshes, may involve the manipulation of data stored in memory 150 which represents the corresponding geological structures, the cells, sub-meshes, sub-mesh parts, horizons or faults. The geological model after processing the faults in accordance with some embodiments of the present invention may be store in memory 150.

Processor 140 may include a local or internal memory 145, such as a cache memory, for relatively fast access to data, e.g., as compared to memory 150.

Input device(s) 165 may include a keyboard, pointing device (e.g., mouse, trackball, pen, touch screen), or cursor direction keys, for communicating information and command selections to processor 140. Input device 165 may communicate user direction information and command selections to processor 140. For example, a user may use input device 165 to select or toggle between displaying a present-day geological model and a past paleo-depositional model of the same geological structure, to select or toggle between displaying or generating a volume-based model and a surface-based model, select a model mode, edit, perform geometrical computations, highlight models, etc.

A display 180 may output a visualization or image of the geological model, for example, generated based on operations executed by processor 140. Display 180 may display data from transmitter 190, receiver 120, or computing system 130. For example, display 180 may display visualizations of surface-based models and/or volume-based models.

Embodiments of the present invention may manipulate data representations of real-world objects and entities such as underground geological features, including faults, horizons and other features such as unconformities or salt bodies. Data received by, for example, receiver 120 receiving waves generated by an air gun or explosives may be manipulated and stored, e.g., in memory 150, and data such as images representing underground features may be presented to a user, e.g., as a visualization on display 180.

In some embodiments of the present invention, editing the volume-based model with new geological data defined within a region of the model may include inputting an initial volume-based surface model and user input data (e.g., input geological data) to system 105. Typically the initial volume-based models may have been derived from initial geological data in the defined region of the model. In various embodiments, the initial volume-based surface model may be derived from a surface-based model or may be derived from a depositional model by using a reverse domain transform. The initial volume-based surface model may be derived using interpolated geological data. In some embodiments, the initial volume-based surface model may have an initial low resolution mesh.

A user of system 105 or processor may determine that the initial volume-based surface model may not include enough resolution in certain higher resolution features of the geological structure and stratigraphy to accurately model the desired petrophysical parameters by a geostatistical simulator, for example. Over Lime, there may be certain high resolution features in a defined region of the geological model that were not previously included in the initial volume-based model. For example, the subsurface strata may include new improved data further defining fault lines and/or new horizon surfaces, and in some cases, new geological features that may have occurred in a short time interval since the initial model survey, for example, due to an earthquake. The user may choose to locally edit portions of the model using new or updated geological data (e.g., input data), which provides improved resolution data or new high resolution features in modeling the geological structure and stratigraphy. The new or updated geological input data may be generated based on real world reflections of the seismic waves through the subsurface strata as measured by transmitter 190 and receiver 120 in system 105. The updated geological data may include geological data of the same geological region that is modeled in the initial geological model, but which may include higher resolution than that of the same region in the initial geological model, and that may be used to refine the initial geological model.

Figure 2A:
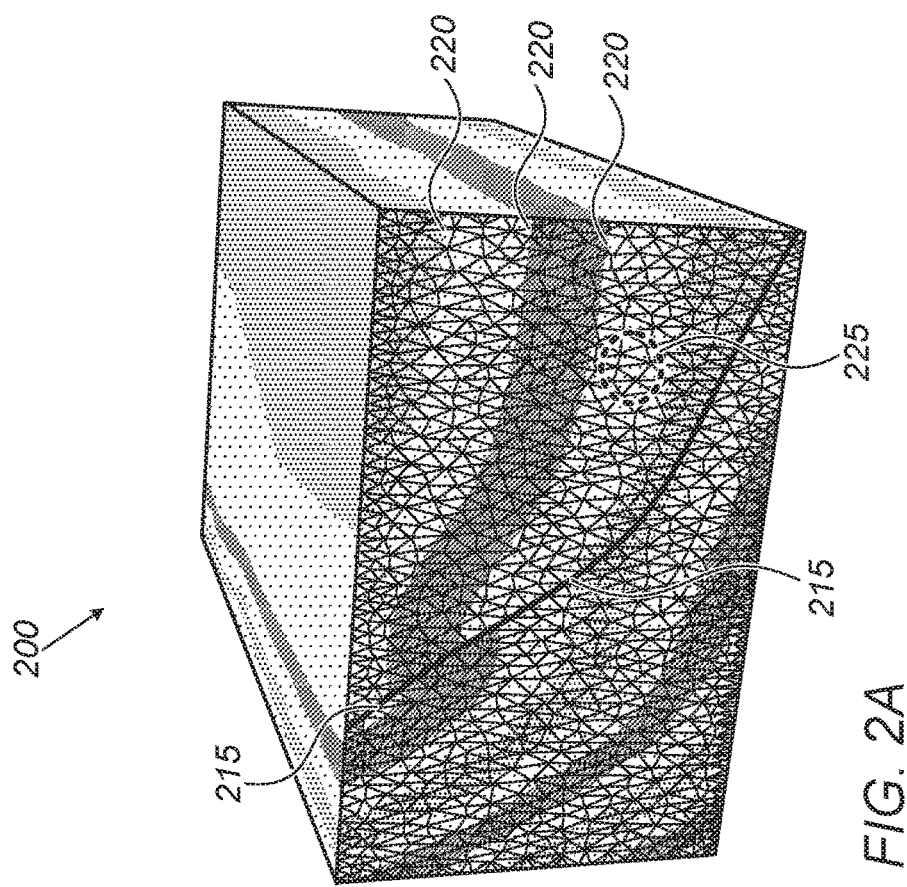

FIG. 2A illustrates an initial volume-based model 200, in accordance with some embodiments of the present invention. Initial volume-based model 200 may include geological structures such as faults 215 and horizon surfaces 220. Initial volume-based model 200 may be populated by a mesh 225, which may include polyhedral cells such as tetrahedral cells, for example. An initial volume-based model 200 may include a geological model in a present-day coordinate space (e.g., XYZ Cartesian coordinate space) and/or a corresponding depositional coordinate space (e.g., UVT coordinate space).

FIG. 2B schematically illustrates input geological data 210 used to edit a defined region 217 of an initial volume-based model 200, in accordance with some embodiments of the present invention. Horizons 220 in FIG. 2B may represent the same geological structures as horizons 220 in volume-based model 200 in FIG. 2A. The initial volume-based model 200 may be derived from initial geological data. The input geological data 210 may include high resolution data of the geometry and topology of horizon surfaces 220 and/or fault 215 such as the surface peak and valley structures in a region 217, relative to the resolution of the same region in initial volume-based model 200. Input geological data 210 may capture details in geometry and topology in horizons 220 and fault 215, which occurred after the measurement of the initial geological data was recorded (e.g., due to recent tectonic shifts) such as a carbonite layer, for example, which may be easily deformed.

In some embodiments of the present invention, the initial volume-based model may be generated with high resolution geometry and topological features, but with higher computational cost in honoring the seismic and/or well data for the initial volume-based model. The initial volume-based model may be generated so as to validate and capture the primary features of the geological structure such as primary horizons and faults, for example. Improving the resolution of the volume-based model may include assessing that there may be a need for improved-resolution models. If an improved resolution model may be needed in a defined region of the initial volume-based model, the defined region may be edited incrementally without affecting the rest of the model.

Figure 3C:
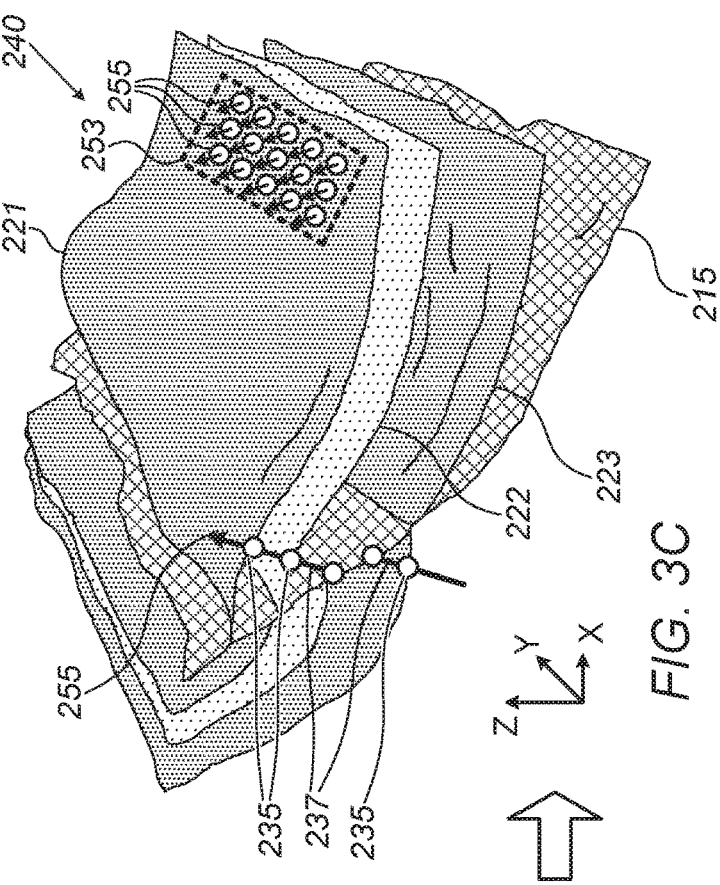
Figure 3A:
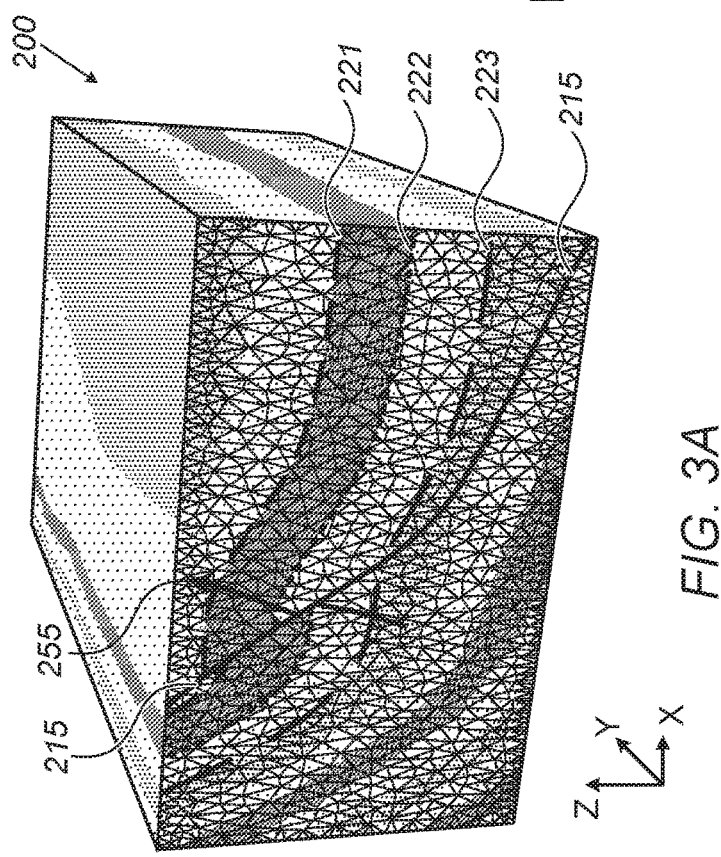

FIG. 3A schematically illustrates volume-based model 200 with a stratigraphic fiber 255 defining stratigraphic layering, in accordance with some embodiments of the present invention. Stratigraphic fiber 255 may define the stratigraphy, stacking, or vertical layering or density of horizon and intra-formational surfaces. Stratigraphic fiber 255 may include an Iso-Paleo-Geological (IPG) line having constant paleo-depositional coordinates and varying in geological time.

Volume-based model 200 (e.g., as in FIG. 2A) may include a plurality of horizons 221, 222, and 223 that are cut by fault 215. Distinctions made in designating three horizon surfaces 221, 222, and 223 from among horizons 220 shown in FIG. 2A are made merely for visual clarity for comparing the same horizon surfaces in the following figures (e.g., FIGS. 3B and 3C) and the input geological data (FIG. 2B). Stratigraphic fiber 255 may be approximately orthogonal (but not limited to since there are different styles of deformation) to horizon surfaces 221, 222, and 223. Stratigraphic fiber 255 may define the spacing between layers or the density of stratigraphic layering.

Figure 3B:
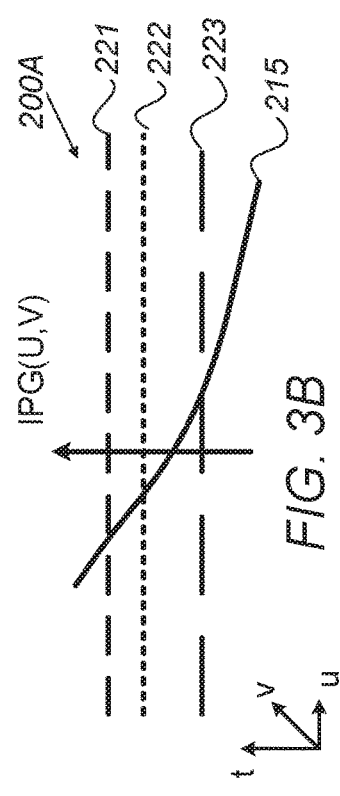

FIG. 3B schematically illustrates a paleo-depositional model representation 200A of a portion of volume-based model 200 in a transformed domain including three distinct horizons 221, 222, and 223 and fault 215, in accordance with some embodiments of the present invention. Paleo-depositional model 200A, such as a UVT model, for example, may represent a model at a time when the geological layers were originally deposited in the Earth. The effect of the domain transform on the volume-based model 200 in FIG. 3A may flatten horizon surfaces across fault 215 as shown in FIG. 3B.

Stratigraphic fiber 255 may be an intersection between iso-surfaces of paleo-geographic coordinates (e.g., u iso-surfaces and v iso-surfaces) in the depositional (e.g., UVT) coordinate space of the paleo-depositional model, where the values of paleo-geographic coordinates (e.g., u,v) are constant along the stratigraphic fiber 255 as the geological-time coordinate (e.g., t or tectonic time coordinate) changes. Thus, stratigraphic fiber 255 may be parallel to the t-axis in depositional (e.g., UVT) space and may orthogonally cut horizons 221, 222, and 223, flattened in depositional (e.g., UVT) space. However, a continuous stratigraphic fiber (e.g., IPG line) in depositional space (e.g., UVT space) may include several segments in XYZ space as in stratigraphic fiber 255 in FIG. 3A In some embodiments of the present invention, in order to update or edit structure and stratigraphy separately, in a defined region of the volume-based model with new geological data, volume-based model 200 may be decomposed into a sealed surface-based model including a plurality of distinct faults and/or horizon surfaces linked by a plurality of stratigraphic fibers (e.g., IPG lines) approximately orthogonal to the distinct horizon surfaces. The fault and/or horizon surfaces may be a subset of faces of the volumetric mesh or may be iso-value surfaces of level sets defined on the volumetric mesh in the initial volume-based model. Stated differently, the plurality of fibers may include a bundle of stratigraphic fibers. Each of the stratigraphic fibers includes one or more control nodes, where each of the control nodes may be located on a particular horizon and/or fault surface, and/or other geological structures, such as unconformities and salt bodies, for example. Thus, each of the horizon and/or fault surfaces may be formed by a plurality of control nodes along a plurality of stratigraphic fibers located on each of the horizon and/or fault surfaces.

The defined region of the decomposed surface-based model may be edited with the geological input data by moving the plurality of control nodes in the defined region to fit the substantially similar horizon and/or fault surfaces in the geological input data that may include more geometric and/or topological features not captured in the initial volume-based model. After editing the surface-based model by moving the control nodes on the stratigraphic fibers, the plurality of distinct horizon surfaces along with the plurality of stratigraphic fibers may be meshed to generate the updated volume-based model with the geological input data with an improved-resolution mesh.

Figures 4A, 4B:
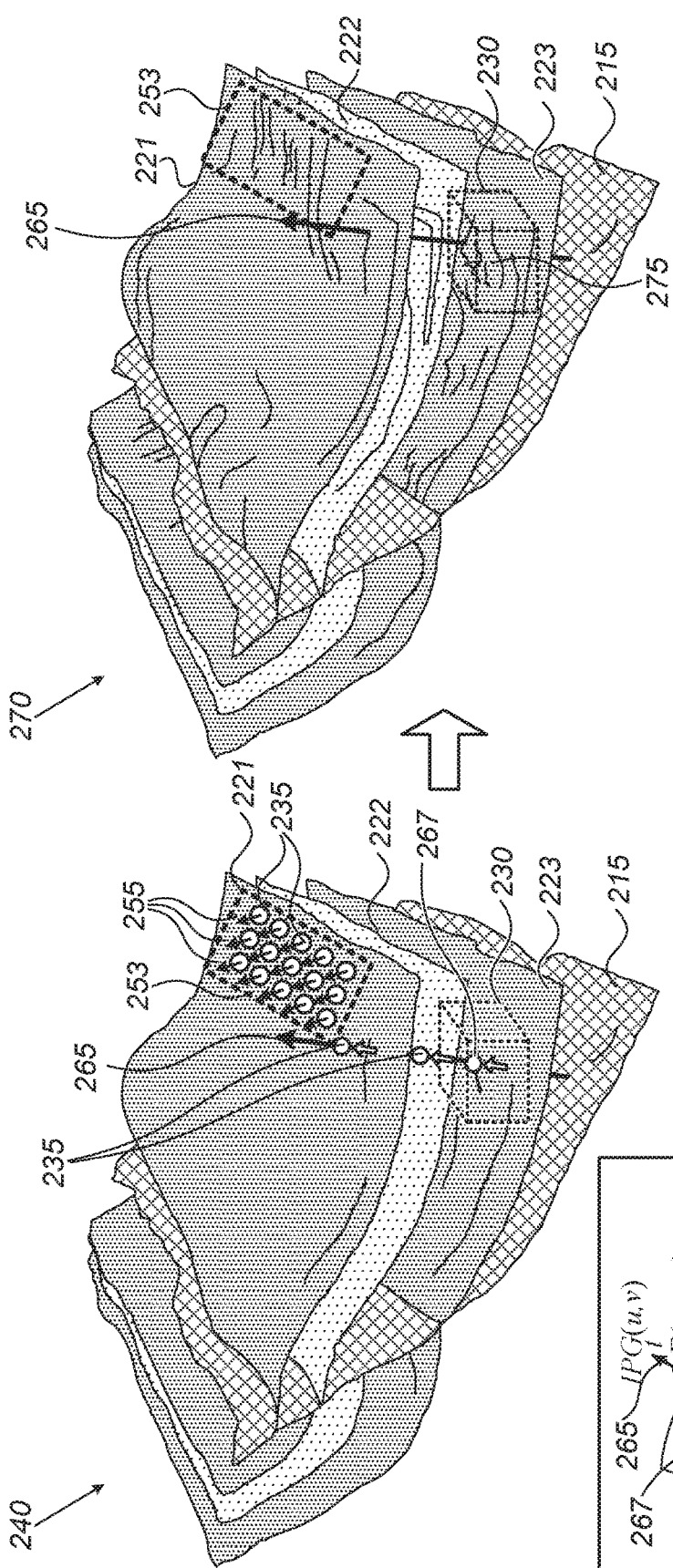

FIG. 3C schematically illustrates a surface-based structural model 240 generated by decomposing an initial volume-based model 200, in accordance with some embodiments of the present invention. To edit a defined region in volume-based model 200 in FIG. 3A, volume-based model 200 may be decomposed into a surface-based structural model 240 with a plurality of stratigraphic fibers 255 (e.g., IPG lines 255). The defined region in the surface based structural model may include a surface patch 253 defined on horizon surface 221, for example. In some embodiments, the defined region of surface-based structural model 240 may include the entire model 240, or a sub-region, or a section of surface-based structural model 240. Defined region 253 may include a defined 3D volume in which the plurality of stratigraphic fibers 255 may pass so as to edit multiple horizon surfaces within the defined 3D volume as shown in FIGS. 4A and 4B.

In some embodiments of the present invention, the plurality of stratigraphic fibers may be visually represented as IPG lines such as IPG line 255. Each of the stratigraphic fibers such as stratigraphic fiber 255 may include IPG lines along with a geological time at each point along the IPG line. Stratigraphic fiber 255 may include which may have control nodes 235 on the respective faults and horizon surface, traversed by the IPG lines. Control nodes 235 along IPG line may be separated by segments 237. The geological time may be defined at control nodes 235 and may use polynomial curves interpolating between control nodes to model segments 237. Thus the geological time may be defined by use of interpolating polynomial curves such as a spline, for example. In some embodiments, the segments may be represented by piecewise-linear curves. A family of control nodes may be located on the same fault and/or horizon forms the horizon and/or fault surface. These fault and/or surfaces may form the sealed structural model.

These horizon and/or fault surfaces may be represented as piecewise-linear polygonal (e.g., triangular) meshes as in a classic surface-based structural model. The geometries of the stratigraphic fibers (e.g., IPG lines) may be given by the polynomials. The associated u and v coordinates of each stratigraphic fiber (e.g., IPG line) may be known. The geological-time (t) coordinate may be defined on each control node 235. The t-function representing a segment between two control nodes along a stratigraphic fiber may be an interpolation of the values on control nodes, such as a linear combination of the values on the control nodes.

In some embodiments of the present invention, the geological-time (t) value of a point between two control nodes may be defined by a linear combination of the two control node values based on interpolation, such as for example, in barycentric coordinates, computed from the parametrization of the curve. Controlling the parameterization of the polynomial curve along segments 237 may control how geological time t varies along the curve, which is another property of a stratigraphic fiber. A bundle of stratigraphic fibers may span a subdomain of the UV plane.

In some embodiments of the present invention, a stratigraphic fiber may define an IPG line 255 with a geological time, such as an associated spline function, for example. Alternatively or additionally, a stratigraphic fiber may be visually represented as a transverse line (e.g., IPG line 255). The stratigraphic fibers in surface-based structural model 240 may be used to maintain information regarding the geological or tectonic time (t) when transforming surface-based structural model 240 back to volume-based model 200 and/or 200A. Upon editing surface-based structural model 240 with new geological data, surface-based structural model 240 with stratigraphic fibers 255 may be used to reconstruct the edited volume-based model such that maintaining accuracy in the t functions associated with the LPG line representation may be useful in accurately reconstructing the edited volume-based model. In some embodiments of the present invention, region 253 includes a bundle of stratigraphic fibers 255 with respective control nodes 235 such as on horizon surface 221, for example.

FIG. 4A schematically illustrates surface-based model 240 with initial geological data, in accordance with some embodiments of the present invention.

FIG. 4B schematically illustrates an edited surface-based model 270 with updated geological data 210 (e.g., from FIG. 2B) within a defined region and initial geological data (e.g., from FIG. 4A) outside of a defined region, in accordance with some embodiments of the present invention. The updated geological data may be higher resolution than the defined region in the initial volume-based model. For example, region 253 (e.g., a surface patch) on horizon 221 and another region 230 (e.g., a 3D volume) may be edited with input geological data 210. A bundle with a high density of stratigraphic fibers 265 passing through 3D region 230 may determine the resolution of the final updated regions, for example, to capture peaks and valleys 275 shown in 3D volume region 230, obtained from the geometry and topology of the input geological data of region 217 shown in FIG. 2B. In some embodiments, the user may define the region to be any suitable size or include any number of horizons and/or faults. In some embodiments, the defined region may include larger regions in the model, or may include the entire model.

In some embodiments of the present invention, editing volume-based model 200 with the new geological data may include deforming the geometry and topology or updating data in one or more defined regions of surface-based structural model 240 using the input geological data 210 for the same or overlapping regions in FIG. 2B. Deforming the geometry and topology of the one or more defined regions may include moving control nodes 235 along stratigraphic fiber 255 to match points on the respective defined regions in the input geological data 210.

In some embodiments of the present invention, control nodes may be moved along stratigraphic fibers intersecting faults and horizon surfaces using Geological Time Refinement (GTR) methodology set forth in U.S. patent application Ser. No. 14/743,118, filed Jun. 18, 2015, which is incorporated herein by reference in its entirety.

In some embodiments of the present invention, editing volume-based model 200 may include altering surface-based model 240 using input geological data 210 only within the defined region and not outside of the defined region.

In some embodiments of the present invention, editing volume-based model 200 may include altering all of the surface-based model 240 globally using input geological data 210 where the defined region is the entire surface based structural model.

In some embodiments of the present invention, editing volume-based model 200 may include altering surface-based model 240 using input geological data 210 only within one or more defined regions and not outside of the one or more defined region. The one or more defined regions may be edited simultaneously or iteratively one after the other.

Bottom left side inset 262 of FIG. 4A shows a stratigraphic fiber 265 (e.g., an IPG line 265) to be edited that includes control node 267 in second defined region 230 located on horizon surface 223. Inset 262 shows that stratigraphic fiber 265 includes points $\Gamma(u,v,t_1)$ and $\Gamma(u,v,t_n)$ at different tectonic times $t_1$ and $t_n$, respectively. Control node 267 on stratigraphic fiber 265 may be located on horizon 223. Control node 267 at a point $r_n$ may be located in a polygonal mesh element (e.g., a triangular element) denoted C (e.g., in a Cartesian coordinates x, y, z). Control node $r_n$ (e.g., control node 267) may be edited or moved along stratigraphic fiber 265 to match the input data in defined region 217 of surface-based model 210 shown in FIG. 2B.

In some embodiments of the present invention, a bundle of stratigraphic fibers including stratigraphic fiber 265 may intersect a respective plurality of initial control nodes on horizon surface 223 such as control node 267, for example, in 3D region 230. The position of these control nodes may be moved along the stratigraphic fibers in the bundle in 3D volume region 230 to fit the geometry and topology in input geological data in region 217 as shown in FIG. 2B. The resolution may be based on the density and/or number of stratigraphic fibers in the bundle in 3D region 230. Editing the initial geological data to conform to the input geological data may yield edited surface based model 270 in FIG. 4B with an improved and/or higher resolution geometry and topology 275 on horizon 223 relative to that shown in 3D region 230 in initial surface based model 240 of FIG. 4A or initial volume-based model 200 of FIG. 3A.

In some embodiments of the present invention, the defined region may include multiple horizon surfaces with multiple control nodes. Editing the defined region may include moving the multiple control nodes, for example, simultaneously or sequentially, along stratigraphic fibers in the defined region so as to fit the input geological data in the respective defined region. In some embodiments, GTR methodologies may be used by solving a system of linear equations.

In some embodiments of the present invention, the defined region may include the entire geological model. Editing the defined region may include globally moving control nodes along stratigraphic fibers traversing multiple horizon surfaces and/or faults so as to fit the input geological data.

FIG. 5 schematically illustrates an edited surface-based model 280 with sealed fault-horizon surface contacts 295, in accordance with some embodiments of the present invention. After moving control nodes along a bundle of stratigraphic fibers (e.g., IPG lines) intersecting a given horizon surface so as to deform the given horizon surface to match the geological input data, the control nodes may pass through a fault and/or through another horizon surface.

Stratigraphic fibers with control nodes on the given horizon surface which pass through a fault and/or another horizon surface may collide with polygonal mesh elements on the fault and/or on other horizon surfaces. For example, stratigraphic fiber 265 associated with polygonal mesh element C may be invalidated when moving control node 267 in FIG. 4A through fault 215. Polygonal mesh elements of the horizon surfaces, for example, that intersect faults and/or other horizon surfaces are removed from the mesh which may leave the structural model unsealed. Stratigraphic fibers intersecting these polygonal mesh elements are invalidated.

An invalid stratigraphic fiber zone may be a volume or sub-region of edited surface-based model 280 with sealed fault-horizon surface contacts 295 which include one or more invalid stratigraphic fibers passing through the region or sub-region. With multiple invalid stratigraphic fibers, the accuracy of the updated volume-based model may be reduced (e.g., upon converting edited surface-based model 280 to generate the updated volume-based model). The tectonic time t information lost due to the multiple invalid stratigraphic fibers may, however, be repaired or updated as described below.

In some embodiments of the present invention, GTR methodologies may be used to move the control points along bundles of stratigraphic fibers to prevent control nodes from crossing horizon surfaces and/or fault surfaces. However, by using GTR methodologies there may not be invalid stratigraphic fibers after moving the control points.

FIG. 6 illustrates an edited surface-based model 282 with updated stratigraphic fibers 296, in accordance with some embodiments of the present invention. The invalid stratigraphic fibers may be updated, or repaired, in the identified invalid stratigraphic fiber zones surrounding sealed fault-horizon surface contacts 295 within edited surface-based model 280 (e.g., as shown in FIG. 5). An intermediate volume-based model may be constructed only in the identified invalid stratigraphic fiber zones. A domain (e.g., UVT) transform honoring the updated surface based structural model 280 and the valid stratigraphic fibers outside the zone may be computed in the multiple identified invalid stratigraphic fiber zones. The domain transform on the intermediate volume-based model may be used to retrieve the lost tectonic t information in the multiple identified invalid stratigraphic fiber zones. The intermediate volume-based model may then be decomposed, e.g., using the same methodology described in reference to FIGS. 3A-3C, resulting in edited surface-based model 282 with repaired stratigraphic fibers 296 shown in FIG. 6.

In some embodiments of the present invention, globally converting surface-based model 280 into a volume-based model where the defined region may include the entire surface based structural model 280 may represent the case where there are no valid stratigraphic fibers. In this case, all of the invalid stratigraphic fibers may be repaired.

In some embodiments of the present invention, the initial volume-based model may be constructed using primary horizon surfaces and faults in the initial geological data over a defined region. There may be additional intermediate or intra-formational horizons in the input geological data defining the stratigraphic layering of surfaces between reference horizons within the defined region of the model being edited including information on stratigraphy within two primary faults and/or between a fault and a horizon that may be used to further improve the accuracy of the t functions in the interpolation of polynomial curves between control nodes of the stratigraphic fibers (e.g, along segments 237). The stratigraphy may be edited to match the resolution of the input geological data. Secondary control nodes may be placed on the stratigraphic fibers, for example, as described in reference to FIG. 7C.

Figure 7B:
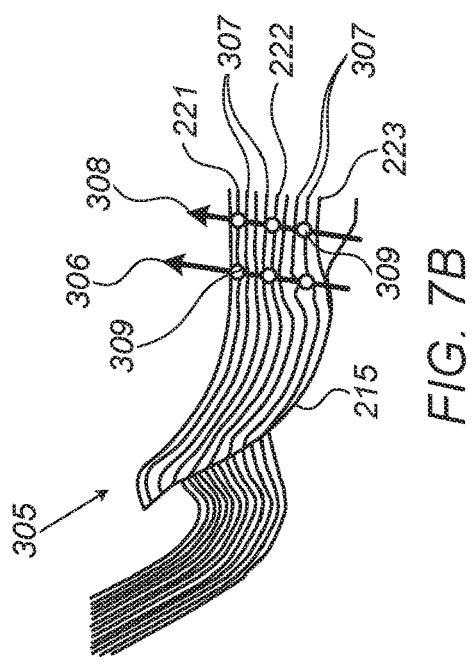
Figure 7C:
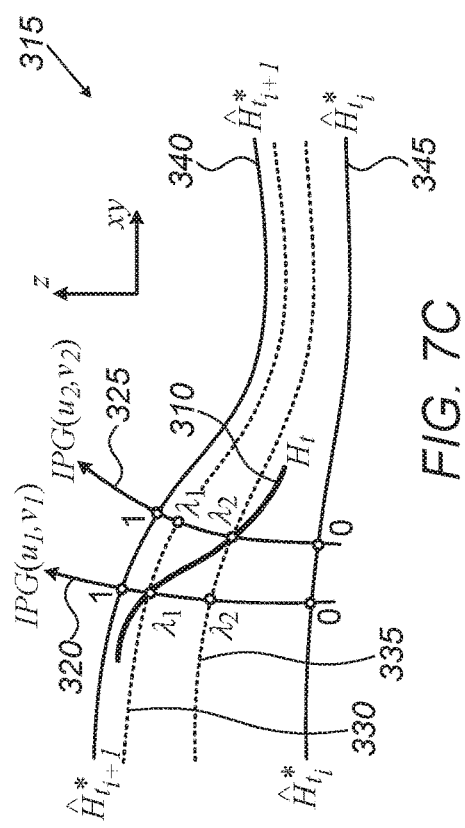
Figure 7A:
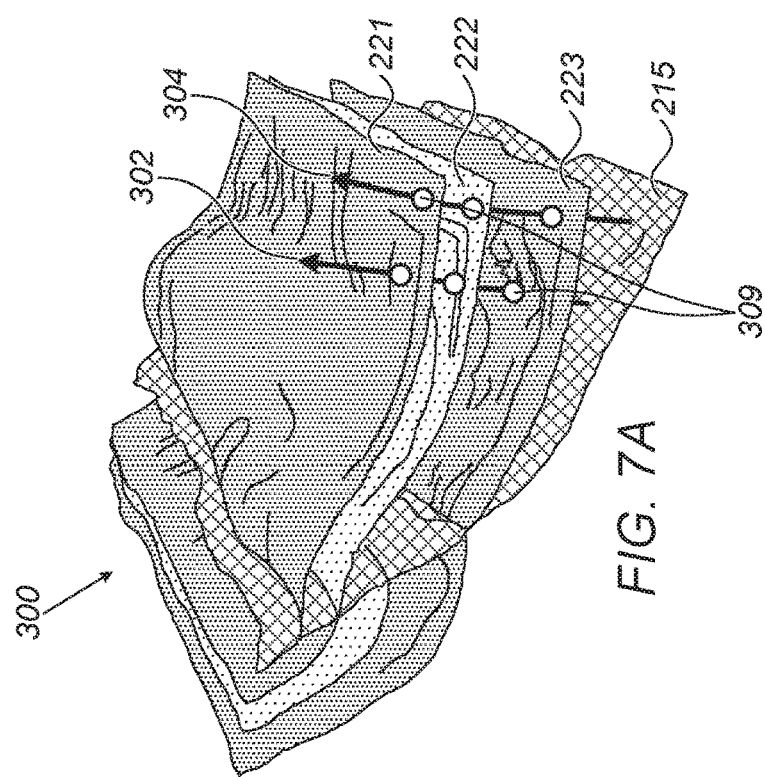

FIG. 7A schematically illustrates an edited surface-based model 300 with two stratigraphic fibers 302 and 304, in accordance with some embodiments of the present invention. Edited surface based model 300 may be based on edited surface-based model 282 with updated stratigraphic fibers 296 (e.g., as shown in FIG. 6). Control nodes 309 include new control nodes on horizon surfaces 221, 222, and 223 generated by editing or moving the initial control nodes along 1D stratigraphic fibers.

FIG. 7B schematically illustrates a surface-based model 305 with two stratigraphic fibers 306 and 308 cutting through primary or reference horizon surfaces 221, 222, and 223 and intra-formational horizon surfaces 307, in accordance with some embodiments of the present invention. The two stratigraphic fibers 306 and 308 may have uniform layering between pairs of the horizon surfaces. In this case, arc-length parametrization of stratigraphic fibers 306 and 308 may be used in the geological time t-function computation. In this case, control nodes 309 are fixed in position as well as their t values as the t function along the polynomial curve segments (e.g., segments 237) between control nodes may be modified.

FIG. 7C schematically illustrates a surface-based model 315 with two stratigraphic fibers 320 and 325 cutting an intra-formational horizon surface 310, in accordance with some embodiments of the present invention. Intra-formational horizon 310 denoted $H_t$ may be located between two primary horizon surfaces 340 and 345 denoted, for example, as $H_{ti+1}$ and $H_{ti}$, respectively. Control nodes on stratigraphic fibers 320 and 325 may be denoted by maximum (e.g., geological time t=1) and minimum (e.g., geological time t=0) values on horizon surfaces $H_{ti+1}$ and $H_{ti}$, respectively. A different approach is taken here due to the curvature of the intra-formational horizon surfaces to further improve the accuracy and/or resolution of the stratigraphy or the geological time of the polynomial curves associated with the interpolation between the two maximum and minimum control nodes of stratigraphic fibers 320 and 325. For example, control points may be placed on the intra-formational horizon surface $H_t$ at $t=t_{Ht}$. In some embodiments, secondary control nodes denoted $\lambda_1$ and $\lambda_2$ may be added locally such that the value of geological time t at control node $\lambda_1$ of IPG($u_1$, $v_1$) may be equal to that of control node $\lambda_2$ of IPG($u_2$, $v_2$).

In some embodiments of the present invention, GTR methodologies may be used to compute the position of the secondary control nodes and the new coefficients of the refined polynomial curves associated with the stratigraphic fibers in subsurface structural model 300.

FIG. 8 schematically illustrates an updated volume-based model 400, in accordance with some embodiments of the present invention. Updated volume-based model 400 may include fault 215 and horizon surfaces 220, which may be generated by meshing or discretizing the domain (e.g., UVT) functions defined on edited surface-based model 300 including the stratigraphic fiber bundle that has been edited with input geological data in one or more edited regions 410.

In some embodiments, the surfaces of the structural model may be used as a constraint in the meshing process. The control nodes of the 2D surface mesh (e.g., forming the vertices of the 2D polygonal mesh cells) forming the surfaces of the edited surface based model may be completely honored in the updated volume-based model. As a result during meshing, the polyhedral 3D mesh may have nodes that are coincident with horizon surfaces 220 as shown for example in a marker 420 showing nodes along the horizon surfaces in contrast to the 3D polyhedral mesh in the initial volume-based model where the 3D polyhedral cells may have few nodes along the horizon surfaces as shown in FIG. 2A.

In some embodiments of the present invention, meshing edited surface-based model 300 with 3D polyhedral cells (e.g., tetrahedral cells) may include forming the volumetric mesh with a subset of 3D cells having nodes constrained to the edited positions of the control nodes. Stated differently, meshing (e.g. by using constrained Delaunay tessellation) edited surface-based model 300 with 3D polyhedral cells (e.g., tetrahedral cells) may include meshing surface-based model 300 with 3D cells where a subset of 3D cells have nodes constrained to the plurality of control nodes at the intersections of the 2D surface cells and the 1D stratigraphic fibers (e.g., where the intersections are alternatively the edited positions of the control nodes.) There may be more cells between horizon and fault surfaces where the geological time of some segments in the plurality of stratigraphic fibers may exhibit higher gradients, that is, where the geological time may change faster on some stratigraphic fibers relative to others.

Outside edited regions 410, updated volume-based model 400 may retain the initial resolution of polyhedral mesh 225 (e.g., tetrahedral mesh elements) in the initial volume-based model 200. Inside edited regions 410, updated volume-based model 400 may have an improved or increased resolution mesh (e.g., with higher polyhedral mesh density) compared to the initial mesh resolution. Generally, the polyhedral mesh density may be higher wherever there may be large variations in the shape of the horizon and/or fault surfaces in the structural model, or wherever there may be a large gradient in the geological time t function of the stratigraphic fibers. The gradient may be used as a constraint in the tessellation process to have more 3D cells where the gradient may be higher some stratigraphic fibers relative to others.

In some embodiments of the present invention, a plurality of nodes may be edited that do not align with horizons in the initial volume-based model to have edited positions that align with horizons in the updated volume-based model.

Figure 9:
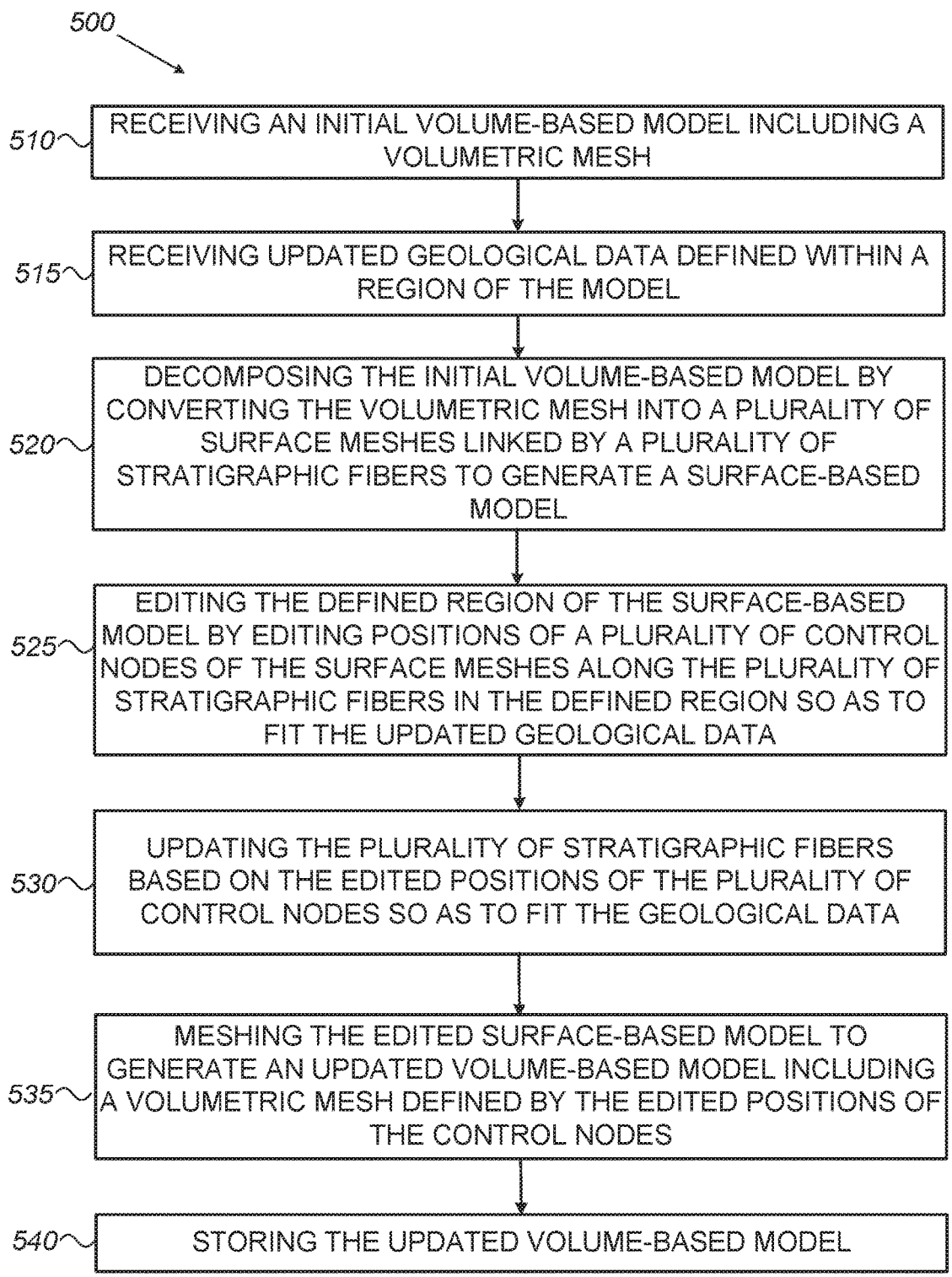
FIG. 9 is a flowchart depicting a method for editing a volume-based model imaging geological structures, in accordance with some embodiments of the present invention.

FIG. 9 is a flowchart depicting a method 500 for editing volume-based model 200 imaging geological structures, in accordance with some embodiments of the present invention. In the example of FIG. 9, method 500 may be executed by processor 140 of system 105. Method 500 may be executed upon a request or command that is issued by a user, or automatically issued by another application.

Method 500 may include receiving 510 an initial volume-based model including a volumetric mesh. Method 500 may include receiving 515 updated geological data defined within a region of the model. Method 500 may include decomposing 520 the initial volume-based model by convening the volumetric mesh into a plurality of surface meshes linked by a plurality of stratigraphic fibers to generate a surface-based model. Method 500 may include editing 525 the defined region of the surface-based model by editing positions of a plurality of control nodes of the surface meshes along the plurality of stratigraphic fibers in the defined region of the model so as to fit the updated geological data.

Method 500 may include updating 530 the plurality of stratigraphic fibers, for example, by updating the geological time associated, based on the edited positions of the plurality of control nodes so as to fit the updated geological data.

In various embodiments, updating 530 the plurality of edited 1D stratigraphic fibers based on the edited positions of the plurality of control nodes may include using arc-length parametrization between the edited positions of the plurality of control nodes when the updated geological data includes uniform layering between pairs of horizon surfaces.

Updating 530 the plurality of edited 1D stratigraphic fibers based on the edited positions of the plurality of control nodes may include adding secondary control nodes along the plurality of stratigraphic fibers at positions intersecting one or more intra-formational horizon surfaces in the updated geological data and interpolating the plurality of edited 1D stratigraphic fibers and/or geological time along segments of the plurality of stratigraphic fibers adjacent to the added secondary nodes.

Method 500 may include meshing 535 the edited surface-based model to generate an updated volume-based model including a volumetric mesh defined by the edited positions of the control nodes. Method 500 may include storing 540 the updated volume-based model.

Figure 10:
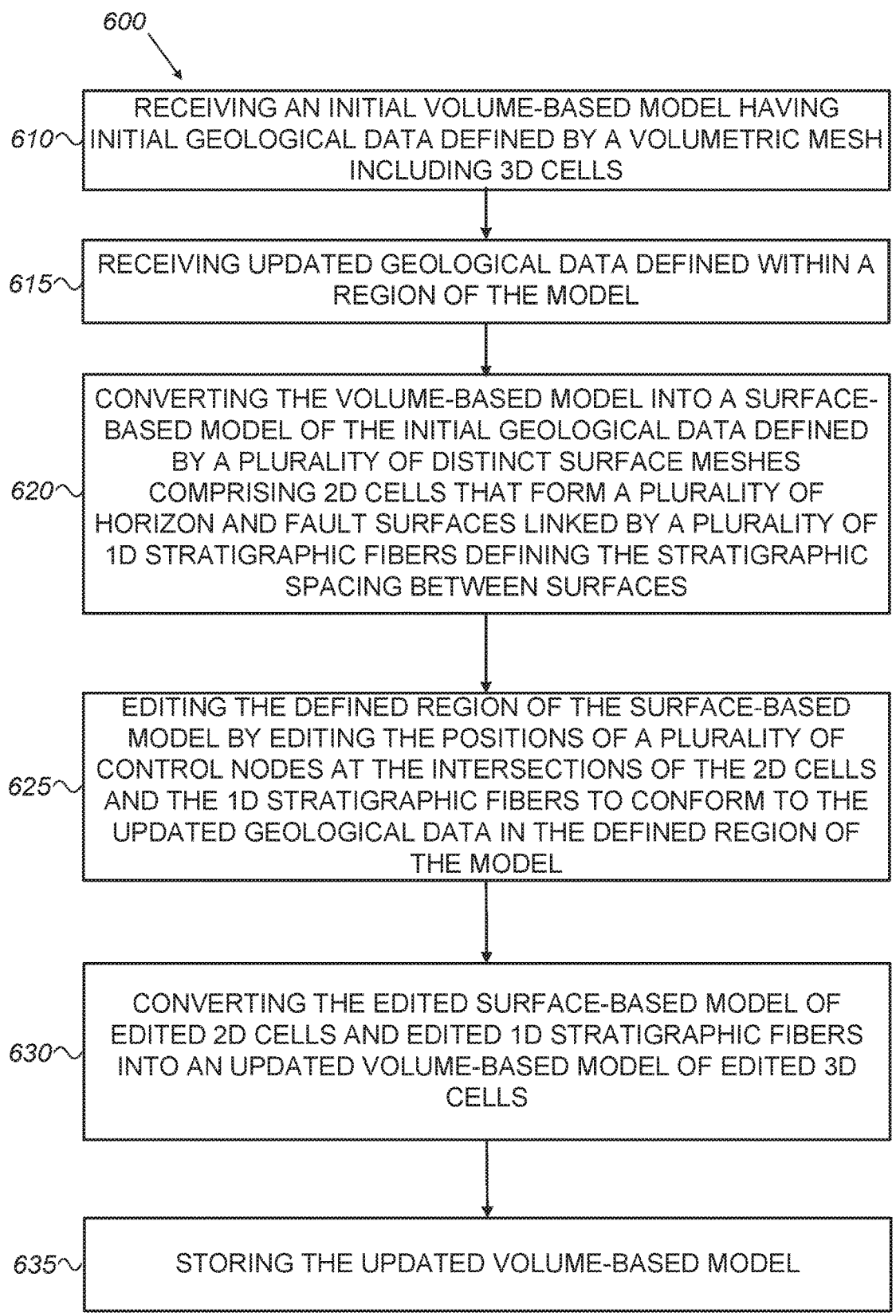
FIG. 10 is a flowchart depicting a method for improving the resolution of volume-based model imaging geological structures, in accordance with some embodiments of the present invention.

FIG. 10 is a flowchart depicting a method 600 for improving the resolution of volume-based model 200 imaging geological structures, in accordance with some embodiments of the present invention. In the example of FIG. 10, method 600 may be executed by processor 140 of system 105. Method 600 may be executed upon a request or command that is issued by a user, or automatically issued by another application.

Method 600 may include receiving 610 an initial volume-based model having initial geological data defined by a volumetric mesh including 3D cells. Method 600 may include receiving 615 updated geological data defined within a region of the model. Method 600 may include converting 620 the volume-based model into a surface-based model of the initial geological data defined by a plurality of distinct surface meshes including 2D cells that form a plurality of horizon and fault surfaces linked by a plurality of 1D stratigraphic fibers defining the stratigraphic spacing between surfaces.

Method 600 may include editing 625 the defined region of the surface-based model by editing the positions of a plurality of control nodes at the intersections of the 2D cells and the 1D stratigraphic fibers to conform to the updated geological data in the defined region of the model. In some embodiments, locally editing 625 the surface-based model may include editing the plurality of control nodes within a 2D sub-surface of the surface meshes and intersecting 1D line segments of the stratigraphic fibers.

Method 600 may include converting 630 the edited surface-based model of edited 2D cells and edited 1D stratigraphic fibers into an updated volume-based model of edited 3D cells. Method 600 may include storing 635 the updated volume-based model.

Figure 11:
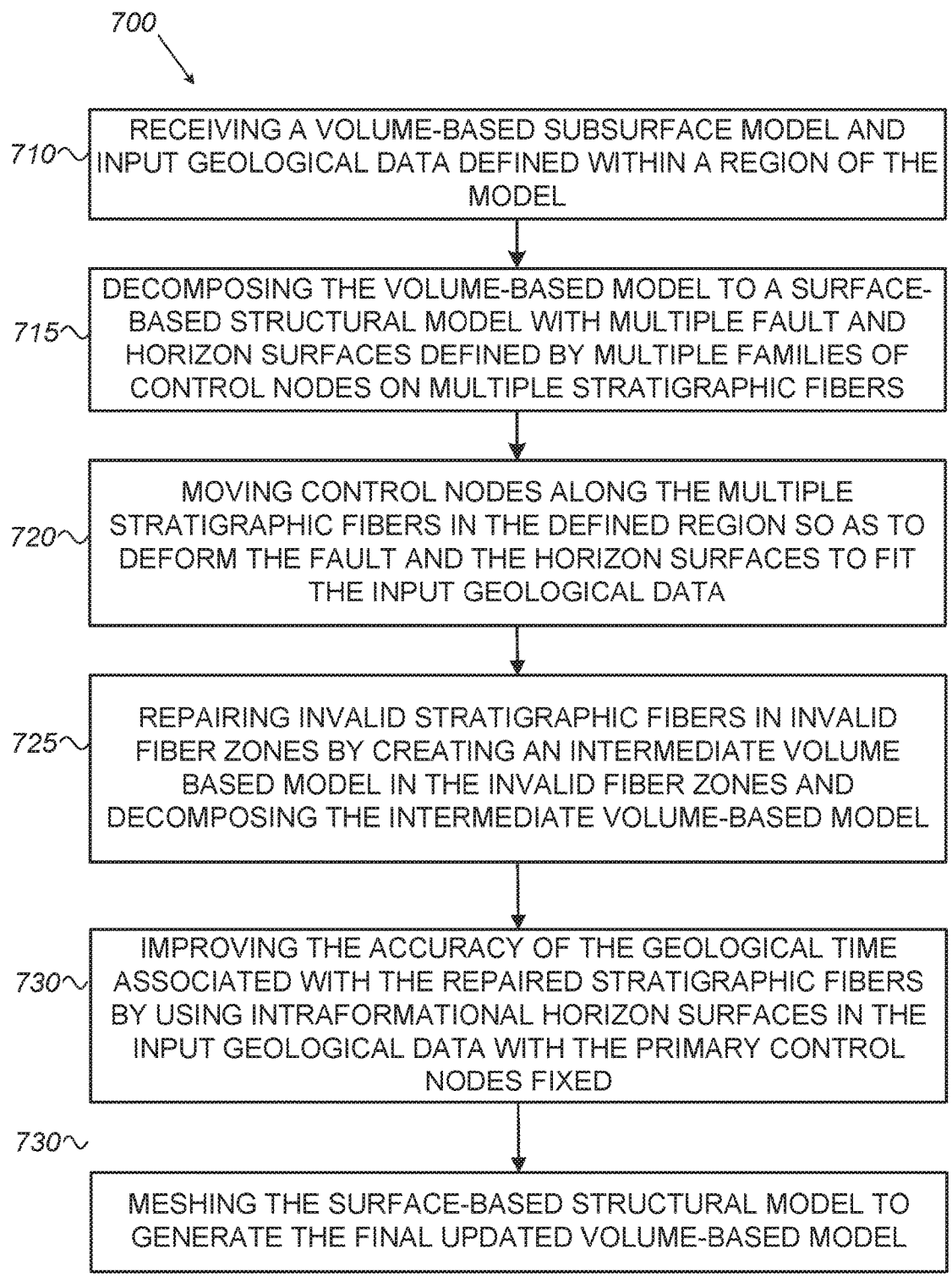
FIG. 11 is a flowchart depicting a method for editing a volume-based model imaging geological structures, in accordance with some embodiments of the present invention.

FIG. 11 is a flowchart depicting another method 700 for editing a volume-based model 200 imaging geological structures, in accordance with some embodiments of the present invention. In the example of FIG. 11, method 700 may be executed by processor 140 of system 105. Method 700 may be executed upon a request or command that is issued by a user, or automatically issued by another application.

Method 700 may include receiving 710 a volume-based model and input geological data defined with a region of the model. Method 700 may include decomposing 715 the volume-based model to a surface-based model with multiple fault and horizon surfaces orthogonally cut by multiple stratigraphic fibers. Method 700 includes moving 720 control nodes along the multiple stratigraphic fibers in the defined region so as to deform the multiple fault and horizon surfaces to fit the input geological data.

In some embodiments the present invention, an invalid stratigraphic fiber may be identified from the plurality of stratigraphic fibers when the edited position of a control node along the stratigraphic fiber crosses to a different edited surface than initially positioned.

Method 700 may include repairing 725 invalid stratigraphic fibers in invalid fiber zones (e.g., error zones) by creating an intermediate volume-based model in the invalid fiber zones and decomposing the intermediate volume-based model.

In some embodiments, repairing 725 the invalid stratigraphic fibers may include repairing the identified invalid 1D stratigraphic fibers by constructing an intermediate volume-based model over one or more error zones that include the identified invalid 1D stratigraphic fibers, computing a paleo-depositional transform of the intermediate volume-based model by extracting a plurality of repaired horizon surfaces and a plurality of repaired 1D stratigraphic fibers to generate a surface-based representation to fix the error zones.

Method 700 may include improving 730 the accuracy of polynomial curves associated with the repaired stratigraphic fibers by using transformation horizon surfaces in the input geological data with the control nodes fixed. Method 700 may include remeshing 730 the surface-based structural model to generate the final updated volume-based model.

In some embodiments of the present invention, editing the volume-based model by moving control nodes along bundles of stratigraphic fibers with input geological data in a defined region of the model may assume that the horizon surfaces and faults are substantially similar in the input geological data. Stated differently, the initial volume-based model may be sufficiently close to the final volume-based model. In cases where new substantially different features (e.g., new faults and horizon surfaces) arise in the new geological data, the new features can be added to the volume-based model iteratively using the steps of method 500, for example, such that the updated volume-based model becomes the initial volume-based model in the next iteration to add the new, substantially different features in the input geological data to the volume-based model.

In some embodiments of the present invention, receiving 510 the initial volume-based model may include receiving an initial surface-based model and meshing the initial surface-based model to convert into the initial volume-based model. In some embodiments of the present invention, an initial paleo-depositional transform of the meshed initial surface-based model may be computed to generate a geological time of approximate time periods when particles of sediment were originally deposited to define the stratigraphy of surfaces in the initial volume-based model.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for editing a volume-based model imaging geological structures, the method comprising:
   receiving an initial volume-based model comprising a volumetric mesh representing initial geological data;
   receiving updated geological data defined within a region of the initial volume-based model;
   decomposing the initial volume-based model by converting the volumetric mesh into a plurality of surface meshes linked by a plurality of stratigraphic fibers with no interconnecting volumetric mesh between the plurality of surface meshes to generate a surface-based model;
   editing a defined region of the surface-based model converted from the defined region of the initial volume-based model by editing positions of a plurality of control nodes of the surface meshes along the plurality of stratigraphic fibers in the defined region of the surface-based model so as to fit the updated geological data;
   updating the plurality of stratigraphic fibers based on the edited positions of the plurality of control nodes so as to fit the updated geological data;
   meshing the edited surface-based model to generate an updated volume-based model comprising a volumetric mesh defined by the edited positions of the control nodes; and
   storing and displaying the updated volume-based model.

2. The method according to claim 1, wherein receiving the initial volume-based model comprises receiving an initial surface-based model and meshing the initial surface-based model to convert into the initial volume-based model.

3. The method according to claim 2, comprising computing an initial paleo-depositional transform of the meshed initial surface-based model to generate a geological time of approximate time periods when particles of sediment were originally deposited to define a stratigraphy of surfaces in the initial volume-based model.

4. The method according to claim 1, wherein the plurality of stratigraphic fibers are Iso-Paleo-Geological (IPG) lines having constant paleo-depositional coordinates and varying in geological time.

5. The method according to claim 1, comprising identifying an invalid stratigraphic fiber from the plurality of stratigraphic fibers when the edited position of a control node along the invalid stratigraphic fiber crosses to a different edited surface than initially positioned.

6. The method according to claim 5, comprising repairing the identified invalid stratigraphic fibers by constructing an intermediate volume-based model over one or more error zones that include the identified invalid stratigraphic fibers, computing a paleo-depositional transform of the intermediate volume-based model to extract a plurality of horizon surfaces and a plurality of stratigraphic fibers to generate a surface-based representation to fix the error zones.

7. The method according to claim 1, wherein updating the plurality of stratigraphic fibers comprises using an arc-length parametrization between the edited positions of the plurality of control nodes when the updated plurality of stratigraphic fibers includes uniform layering between pairs of horizon surfaces.

8. The method according to claim 1, wherein updating the plurality of stratigraphic fibers comprises adding secondary control nodes along the plurality of stratigraphic fibers at positions intersecting one or more intra-formational horizon surfaces in the updated geological data and interpolating along segments of the plurality of stratigraphic fibers adjacent to the added secondary nodes.

9. A method for editing a volume-based model imaging geological structures, the method comprising:
receiving an initial volume-based model having initial geological data defined by a volumetric mesh comprising 3D cells;
receiving updated geological data defined within a region of the initial volume-based model;
converting the initial volume-based model into a surface-based model of the initial geological data defined by a plurality of distinct surface meshes comprising 2D cells that form a plurality of horizon and fault surfaces linked by a plurality of 1D stratigraphic fibers defining the stratigraphic spacing between surfaces;
editing a defined region of the surface-based model converted from the defined region of the initial volume-based model by editing positions of a plurality of control nodes at the intersections of the 2D cells and the 1D stratigraphic fibers to conform to the updated geological data in the defined region of the surface-based model;
converting the edited surface-based model of edited 2D cells and edited 1D stratigraphic fibers into an updated volume-based model of edited 3D cells; and
storing and displaying the updated volume-based model.

10. The method according to claim 9, wherein receiving the initial volume-based model comprises receiving an initial surface-based model and meshing the initial surface-based model to convert into the initial volume-based model.

11. The method according to claim 9, comprising identifying an invalid 1D stratigraphic fiber from the plurality of 1D stratigraphic fibers when the edited position of a control node along the invalid 1D stratigraphic fiber crosses to a different edited surface than initially positioned.

12. The method according to claim 11, comprising repairing the identified invalid 1D stratigraphic fibers by constructing an intermediate volume-based model over one or more error zones that include the identified invalid 1D stratigraphic fibers, computing a paleo-depositional transform of the intermediate volume-based model by extracting a plurality of repaired horizon surfaces and a plurality of repaired 1D stratigraphic fibers to generate a surface-based representation to fix the error zones.

13. The method according to claim 9, comprising updating the plurality of edited 1D stratigraphic fibers based on the edited positions of the plurality of control nodes by using arc-length parametrization between the edited positions of the plurality of control nodes when the updated geological data includes uniform layering between pairs of horizon surfaces.

14. The method according to claim 9, comprising updating the plurality of edited 1D stratigraphic fibers based on the edited positions of the plurality of control nodes by adding secondary control nodes along the plurality of stratigraphic fibers at positions intersecting one or more intra-formational horizon surfaces in the updated geological data and interpolating segments of the plurality of edited stratigraphic fibers adjacent to the added secondary nodes.

15. The method according to claim 9, comprising locally editing the surface-based model by editing the plurality of control nodes within a 2D sub-surface of the surface meshes and intersecting 1D line segments of the stratigraphic fibers.

16. A system for editing a volume-based model imaging geological structures, the system comprising:
one or more processors configured to receive an initial volume-based model comprising a volumetric, to receive updated geological data defined within a region of the initial volume-based model, to decompose the initial volume-based model by converting the volumetric mesh into a plurality of surface meshes linked by a plurality of stratigraphic fibers with no interconnecting volumetric mesh between the plurality of surface meshes to generate a surface-based model, to edit a defined region of the surface-based model converted from the defined region of the initial volume-based model by editing positions of a plurality of control nodes of the surface meshes along the plurality of stratigraphic fibers in the defined region of the surface-based model so as to fit the updated geological data, to update the plurality of stratigraphic fibers based on the edited positions of the plurality of control nodes so as to fit the updated geological data, and to mesh the edited surface-based model to generate an updated volume-based model comprising a volumetric mesh defined by the edited positions of the control nodes;
one or more memories to store the updated volume-based model; and
a display configured to visualize the updated volume-based model.

17. The system according to claim 16, wherein the processor is configured to receive the initial volume-based model by receiving an initial surface-based model and meshing the initial surface-based model to convert into the initial volume-based model.

18. The system according to claim 16, wherein the processor is configured to compute an initial paleo-depositional transform of the meshed initial surface-based model to generate a geological time of approximate time periods when particles of sediment were originally deposited to define a stratigraphy of surfaces in the initial volume-based model.

19. The system according to claim 16, wherein the plurality of stratigraphic fibers are Iso-Paleo-Geological (IPG) lines having constant paleo-depositional coordinates and varying in geological time.

20. The system according to claim 16, wherein the processor is configured to identify an invalid stratigraphic fiber from the plurality of stratigraphic fibers when the edited position of a control node along the invalid stratigraphic fiber crosses to a different edited surface than initially positioned.

21. The system according to claim 20, wherein the processor is configured to repair the identified invalid stratigraphic fibers by constructing an intermediate volume-based model over one or more error zones that include the identified invalid stratigraphic fibers, computing a paleo-depositional transform of the intermediate volume-based model to extract a plurality of horizon surfaces and a plurality of stratigraphic fibers to generate a surface-based representation to fix the error zones.

22. The system according to claim 16, wherein the processor is configured to update the plurality of stratigraphic fibers by using an arc-length parametrization between the edited positions of the plurality of control nodes when the updated geological data includes uniform layering between pairs of horizon surfaces.

23. The system according to claim 16, wherein the processor is configured to update the plurality of stratigraphic fibers by adding secondary control nodes along the plurality of stratigraphic fibers at positions intersecting one or more intra-formational horizon surfaces in the updated geological data and interpolating along segments of the plurality of stratigraphic fibers adjacent to the added secondary nodes.

24. A system for editing a volume-based model imaging geological structures, the system comprising:
one or more processors configured to receive an initial volume-based model having initial geological data defined by a volumetric mesh comprising 3D cells, to receive updated geological data defined within a region of the initial volume-based model, to convert the initial volume-based model into a surface-based model of the initial geological data defined by a plurality of distinct surface meshes comprising 2D cells that form a plurality of horizon and fault surfaces linked by a plurality of 1D stratigraphic fibers defining the stratigraphic spacing between the surfaces, to edit a defined region of the surface-based model converted from the defined region of the initial volume-based model by editing positions of a plurality of control nodes at the intersections of the 2D surface cells and the 1D stratigraphic fibers to conform to the updated geological data in the defined region of the surface-based model, to convert the edited surface-based model of edited 2D cells and edited 1D stratigraphic fibers into an updated volume-based model of edited 3D cells;
one or more memories to store the updated volume-based model; and
a display configured to visualize the updated volume-based model.

25. The system according to claim 24, wherein the processor is configured to receive the initial volume-based model by receiving an initial surface-based model and meshing the initial surface-based model to convert into the initial volume-based model.

26. The system according to claim 24, wherein the processor is configured to identify an invalid 1D stratigraphic fiber from the plurality of 1D stratigraphic fibers when the edited position of a control node along the invalid 1D stratigraphic fiber crosses to a different edited surface than initially positioned.

27. The system according to claim 26, wherein the processor is configured to repair the identified invalid 1D stratigraphic fibers by constructing an intermediate volume-based model over one or more error zones that include the identified invalid 1D stratigraphic fibers, computing a paleo-depositional transform of the intermediate volume-based model by extracting a plurality of repaired horizon surfaces and a plurality of repaired 1D stratigraphic fibers to generate a surface-based representation to fix the error zones.

28. The system according to claim 24, wherein the processor is configured to update the plurality of edited 1D stratigraphic fibers based on the edited positions of the plurality of control nodes by using arc-length parametrization between the edited positions of the plurality of control nodes when the updated geological data includes uniform layering between pairs of horizon surfaces.

29. The system according to claim 24, wherein the processor is configured to update the plurality of edited 1D stratigraphic fibers based on the edited positions of the plurality of control nodes by adding secondary control nodes along the plurality of stratigraphic fibers at positions intersecting one or more intra-formational horizon surfaces in the updated geological data and interpolating segments of the plurality of stratigraphic fibers adjacent to the added secondary nodes.

30. The system according to according to claim 24, wherein the processor is configured to locally edit the surface-based model by editing the plurality of control nodes within a 2D sub-surface of the surface meshes and intersecting 1D line segments of the stratigraphic fibers.

31. The method of claim 1, wherein the initial and updated geological data is geological data of the subsurface of the Earth produced in a three-dimensional field generated based on measurements of waves emitted by a set of wave generators, reflected at geological discontinuities throughout the subsurface strata, and recorded by a set of receiver devices.

* * * * *